(12) United States Patent
Martinez et al.

(10) Patent No.: US 11,002,970 B2
(45) Date of Patent: May 11, 2021

(54) MULTI-FOCAL CATADIOPTRIC HEAD MOUNTED DISPLAY WITH LC SWITCH

(71) Applicant: GOOGLE LLC, Mountain View, CA (US)

(72) Inventors: Oscar Martinez, Mountain View, CA (US); Yi Qin, Mountain View, CA (US); Serge Bierhuizen, San Jose, CA (US)

(73) Assignee: Google LLC, Mountain View, CA (US)

( * ) Notice: Subject to any disclaimer, the term of this patent is extended or adjusted under 35 U.S.C. 154(b) by 45 days.

(21) Appl. No.: 16/437,461

(22) Filed: Jun. 11, 2019

(65) Prior Publication Data

US 2020/0249480 A1 Aug. 6, 2020

Related U.S. Application Data

(60) Provisional application No. 62/801,971, filed on Feb. 6, 2019.

(51) Int. Cl.
*G02B 27/01* (2006.01)
*G02F 1/1335* (2006.01)
*G02B 27/28* (2006.01)
*G02B 5/08* (2006.01)

(52) U.S. Cl.
CPC .......... *G02B 27/0172* (2013.01); *G02B 5/08* (2013.01); *G02B 27/283* (2013.01); *G02F 1/133528* (2013.01)

(58) Field of Classification Search
CPC .... G02B 27/0172; G02B 27/283; G02B 5/08; G02F 1/133528
See application file for complete search history.

(56) References Cited

U.S. PATENT DOCUMENTS

| 6,075,651 | A | 6/2000 | Hoppe | |
|---|---|---|---|---|
| 2007/0070357 | A1 | 3/2007 | Aiyer | |
| 2009/0027772 | A1 | 1/2009 | Robinson | |
| 2009/0207379 | A1 | 8/2009 | Oakley | |
| 2013/0176350 | A1 | 7/2013 | Fergason | |
| 2017/0146803 | A1* | 5/2017 | Kishigami | ........... H04N 9/3167 |
| 2018/0124364 | A1 | 5/2018 | Yata et al. | |
| 2019/0025602 | A1 | 1/2019 | Qin et al. | |
| 2020/0026075 | A1 | 1/2020 | Kim et al. | |

OTHER PUBLICATIONS

Partial International Search Report dated Mar. 6, 2020 for International Application No. PCT/US2019/064912, 15 pages.

* cited by examiner

*Primary Examiner* — Afroza Chowdhury

(57) ABSTRACT

A system includes an electronic display for emitting light toward an eye-ward side of the system. A beam splitter receives emitted light from the display. The beam splitter includes a polarization beam splitting (PBS) film and a mirror coating to generate two orthogonal polarization states with different optical paths thereby creating a first focal plane and a second focal plane at the eye-ward side of the system. At least one liquid crystal switch is positioned to receive light from the display in a light path between the display and the eye-ward side of the system.

27 Claims, 11 Drawing Sheets

MULTI-FOCAL CATADIOPTRIC HEAD MOUNTED DISPLAY WITH LC SWITCH

CROSS-REFERENCE TO RELATED APPLICATION

The present application claims priority to U.S. Provisional Patent Application No. 62/801,971, titled "MULTI-FOCAL CATADIOPTRIC WITH LC SWITCH" and filed on Feb. 6, 2019, the entirety of which is incorporated by reference herein.

BACKGROUND

A typical head mounted display (HMD) has a display plane focused at a single fixed focal distance. Such arrangement can lead to vergence accommodation conflict (VAC), and thereby cause user discomfort as the user's eyes change their movement patterns to focus on positions of objects displayed in 3D. To implement multi-focal and varifocal displays, prior technologies used various approaches. For example, some HMDs axially move the display relative to certain components to change a back focal distance. Other HMDs use an Alvarez lens to change a focal distance by moving an element along a lateral direction.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical components. Unless otherwise indicated, components and relations therebetween are not drawn to scale.

DETAILED DESCRIPTION

Multi-focal displays can reduce vergence accommodation conflict (VAC) and improve user comfort during extended use. The described embodiments generate two or more virtual images at different accommodation distances with a single display in a catadioptric head mounted display (HMD) for virtual reality (VR) and augmented reality (AR) applications. A display subsystem of the HMD generates two virtual images that have orthogonal polarization states and which are time multiplexed with a liquid crystal switch (e.g., a polarizer and a half wave liquid crystal (LC) layer, or a half wave polarizer layer) of the HMD. The HMD further includes a geometric phase (GP) lens to either enable see-through or two additional virtual image distances—for a total of four accommodation distances. Some embodiments implement a specialized beam splitter and GP lenses to encode focal distance with optical polarization. An LC switch with linear polarizers is then used to select which polarization state to display to a user. Focal planes can be temporally multiplexed rapidly to effectively display the focal planes simultaneously to the user. In some embodiments, as another option, an optimal focal plane is chosen based on a content, or a user vergence, or both a content and user vergence, and the focal plane is only changed if the content or the vergence change. Catadioptric systems combine refraction (lenses) and reflection in a single optical device such as an HMD.

The arrangement of components in the embodiments enables multi-focal HMDs without the need for moving elements and supports large aperture sizes. Prior solutions cannot achieve both features simultaneously. The embodiments and the techniques described herein provide a low cost of manufacture, a large aperture in terms of a large eye box for the HMD, fast image updates, and a small form factor. Other technologies with pixelated LC layers may have some similar characteristics, but do not enable large apertures. FIGS. 1-19 illustrate aspects of the catadioptric HMDs described herein.

Figure 1:
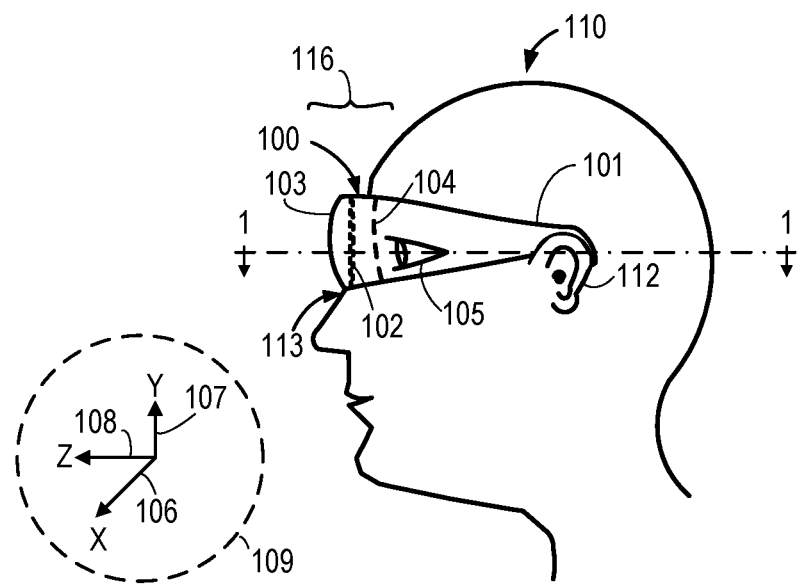
FIG. 1 is a simplified diagram of a side view of a catadioptric head mounted display (HMD) in accordance with some embodiments.

FIG. 1 is a simplified diagram of a side view of a catadioptric HMD 100 in accordance with some embodiments. Each of the elements of the HMD 100 takes the form of one of various possible embodiments as further described herein. The HMD 100 includes a frame 101 that supports a display subsystem 116. The display subsystem 116 is generally positioned in front of a user 110 and the user's eyes. The display subsystem 116 includes at least one electronic display 102 that produces light for one or both user eyes 105 of a user 110. The frame 101 includes one or more arms that extend from a front of the user 110 and that rest on one or more ears 112 on a side of the user's head. In at least some embodiments, a portion of the frame 101 rests on a bridge 113 of a nose of the user 110. A lens 103 is positioned outside of a polarization filter 104 and the electronic display 102. In some embodiments, the lens 103 is a combiner that allows light to pass therethrough or a light reflector that directs light to the eye or eyes 105 of the user 110. The polarization filter 104 is in a light path between the electronic display 102 and an expected position of one or both user eyes 105. As shown, the polarization filter 104 is on an eye-ward side of the reflector 103. the display 102 is on a world-facing side or world-side of the polarization filter 104. While a single line structure is illustrated, the polarization filter 104 is a composite structure in many embodiments and the polarization filter 104 includes a plurality of layers as further described herein.

A vision and device coordinate system 109 provides a reference for FIG. 1 and for other figures. According to some embodiments, each of the lens 103 and the polarization filter 104 are curved along at least one of a first axis or dimension 106 labeled X and along a second axis 107 labeled Y, the second axis 107 being different from the first directional axis 106. A curvature along the first axis 106 is referred to as a horizontal arc along a certain number of degrees of azimuth with respect to the HMD 100 and the user 110. A curvature along the second axis 107 is referred to as a vertical arc along a certain number of degrees of altitude with respect to the HMD 100 and the user 110. A third axis 108 is labeled Z and is an optical axis relative to the user's eyes 105 and for the optical elements of the HMD 100. One or more of the electronic display 102, the lens 103, and the polarization filter 104 are curved to for comfort or to accommodate the geometry of the head and eyes 105 of the user 110.

Figure 2:
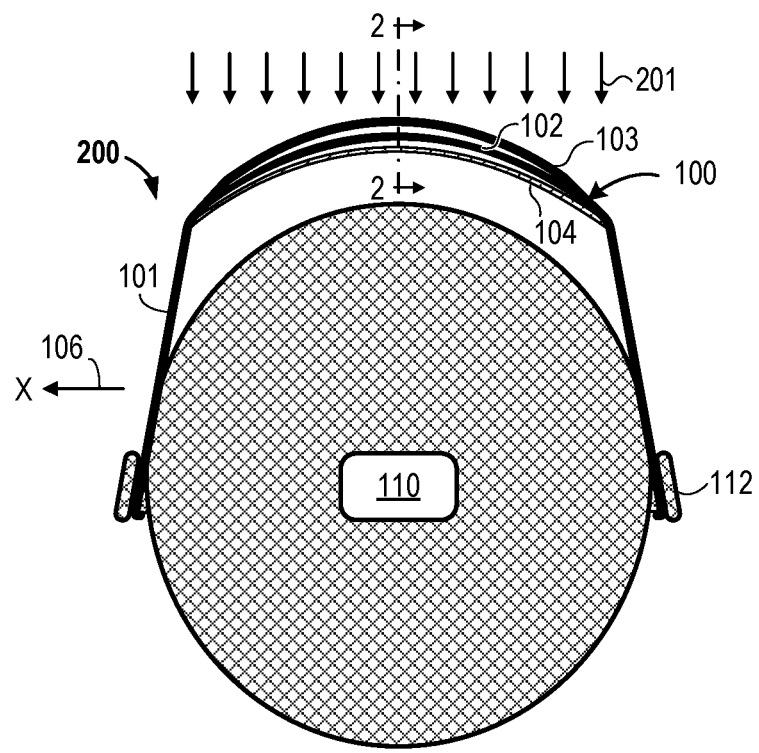
FIG. 2 is a simplified view of the HMD through line 1-1 of FIG. 1 in accordance with some embodiments.

FIG. 2 is an overhead cross-sectional view 200 generally along line 1-1 of the catadioptric HMD 100 shown in FIG. 1. The frame 101 supports the electronic display 102, the lens 103, and the polarization filter 104. The frame 101 rests at least on the ears 112 of the user 110. According to the embodiment shown, each of the electronic display 102, the lens 103, and the polarization filter 104 is curved along a first axis 106. In some embodiments, such as in an augmented reality device, ambient light 201 passes through at least the lens 103 and the polarization filter 104 to reach the eyes of the user 110. Subsequent figures illustrate at least the electronic display 102 and one or more layers represented by the polarization filter 104 as viewed generally along line 2-2 of the overhead cross-sectional view 200. In some embodiments, the electronic display 102 is one of: a liquid crystal display (LCD), a thin film transistor (TFT) LCD display, a light-emitting diode (LED) display, an organic LED (OLED) display, an active-matrix OLED (AMOLED) display, a plasma display, and an electroluminescent display.

Figure 3:
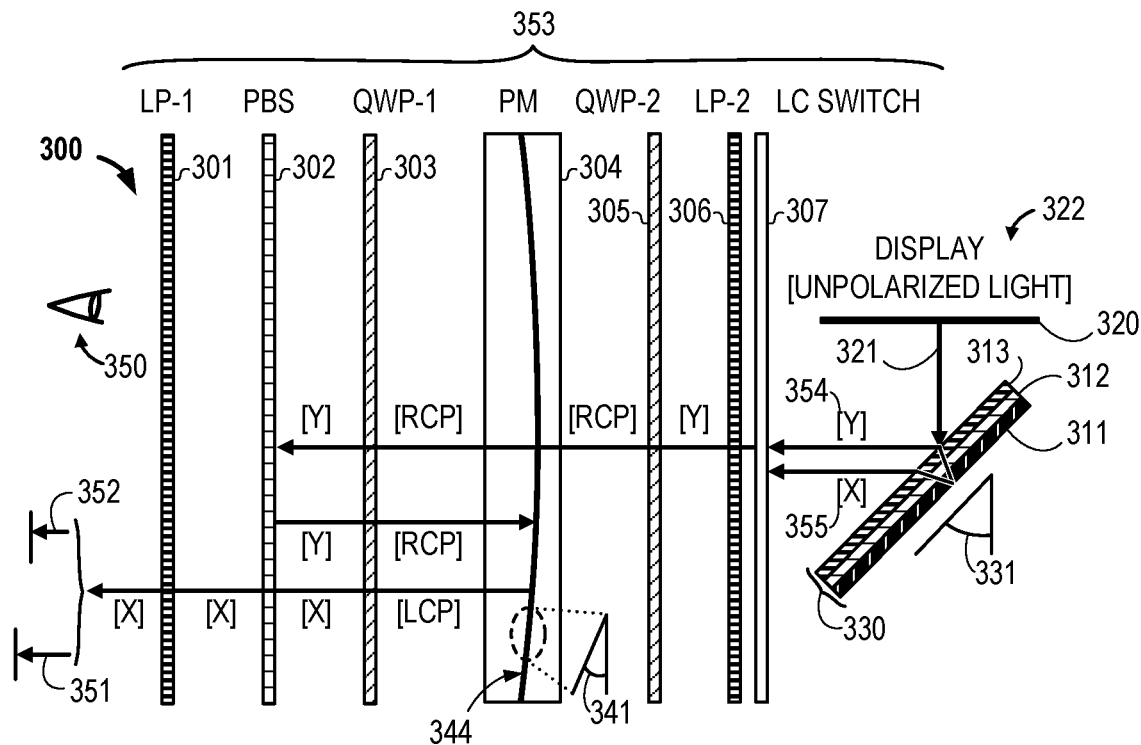
FIG. 3 is a block diagram of a fixed focus catadioptic system providing two focal planes in an HMD according to some embodiments.

FIGS. 3-10 illustrate a virtual reality (VR) arrangement of components and provide two focal planes in an HMD. FIG. 3 is a block diagram of a fixed focus catadioptic system 300 providing two focal planes in an HMD according to a first embodiment. The system 300 has a virtual reality (VR) arrangement of components and illustrates a polarization ray path referred to as a lightpath 353 between an electronic display 320 at a first side 322 of the HMD and an eye-ward side 350 of the HMD. From left to right, the components of the system 300 include: a first linear polarizer (LP-1) 301, a polarizing beam splitter (PBS) 302, a first quarter wave plate (QWP-1) 303, a partial mirror (PM) 304, a second quarter wave plate (QWP-2) 305, a second linear polarizer (LP-2) 306, a liquid crystal (LC) switch 307, and layers illustrated as grouped in a reflective bundle or beam splitter 330. The beam splitter 330 includes, from bottom to top, a 100% mirror 311, a linear polarizer 312, and a polarization beam splitting film 313. The polarization beam splitting film 313 is also referred to herein as a PBS film 313 or just PBS 313 for brevity and clarity. A similar naming convention is applicable to other components as understood in the art. For example, the mirror 311 takes one of a plurality of forms including: a coating or plurality of coatings applied to a first side or a second side of a substrate such as a substantially transparent optical plane parallel plate (PPP), and a coating or plurality of coatings applied to another film or layer in a system such as a linear polarizer layer (e.g., the linear polarizer 312) ora film (e.g., the PBS film 313). For sake of clarity, one or more PPPs are omitted from illustration of the beam splitter 330 and are part of one or more of the 100% mirror 311, the linear polarizer 312, and the PBS film 313 as understood by those in the art.

Unpolarized light 321 is emitted by the electronic display 320 toward the beam splitter 330. In some embodiments, one or more of each component of the beam splitter 330 is positioned at an angle 331 such as a 45-degree angle with respect to incident display light 321. While shown as a parallel arrangement of components all arranged at approximately a same angle with respect to the display 320 or the LC switch 307, the beam splitter 330 can have a wedge angle between two or more components 311-313 to align or re-align the two focal planes 351, 352 for a user observing light at the eye-ward side 350 of the HMD. That is, one or more components 311-313 of the beam splitter 330 are positioned at a non-parallel orientation with respect to the others. For example, the linear polarizer 312 is positioned at a non-parallel orientation with respect to the PBS film 313.

Based on the properties of the PBS film 313, light 321 originating from the display 320 is split into two types of light along two respective lightpaths that differ in length from the display 320 to the eye-ward side 350 of the HMD. The first path and the second path are at least partially based on the PBS film 313 as indicated by a first light state [Y] and a second light state [X], respectively, at a first position 354 and a second position 355. In some embodiments, the first light state [Y] is linearly polarized along the y-axis as some of the incident light 321 on the PBS film 313 is reflected toward the LC switch 307. Other light reaching the PBS film 313 passes through to the linear polarizer 312, is incident on the 100% mirror 311, and is reflected back through the linear polarizer 312 and out through the PBS film 313. The second light state [X] is different from the first light state [Y] based at least on the linear polarizer 312 as the two paths are linearly polarized along orthogonal axes. Along the lightpath 353, the light states may take the form of one of two orthogonal polarization states—such as a first polarization state in a righthand circular polarized (RCP) state and a second polarization state in a lefthand circular polarized (LCP) state.

Light continues from the beam splitter 330 through the LC switch 307, the LP-2 306, and the QWP-2 305 before encountering the partial mirror 304. The LC switch 307 includes at least a liquid crystal layer able to actively rotate the polarization state of the light passing therethrough. For example, the LC switch 307 is a half wave retarder. The light 321 output from the display 320 is synchronized with the LC switch 307 to generate content at each of two focal planes 351, 352 at the eye-ward side 350 of the HMD. In some embodiments, the second linear polarizer 306 adjacent in time to the LC switch 307 or a polarizer layer of the LC switch 307 enables selection of each polarization light state individually. While not illustrated, a display backlight is pulsed (e.g., between 10-20% of a duty cycle, between 5-25% of a duty cycle, between 1-55% of a duty cycle) after the LC switch 307 is settled.

LC molecules take time (e.g., on the order of milliseconds) to rotate and stabilize after a change in voltage has been applied in the LC switch 307. The display light should only be pulsed after the LC molecules have settled, so as to not induce image artifacts. The partial mirror 304 includes a partial mirror surface 344. In some embodiments, as illustrated, the partial mirror surface 344 is oriented along a curve having a partial mirror curve angle 341 at each particular location along the curve relative to the lightpath 353 between the display 320 and the eye-ward side 350 of the HMD. A curved partial mirror surface 344 focuses light at the eye-ward side 350 of the HMD based on being reflected from the partial mirror surface 344.

Some of the light that passes through both the partial mirror 304 and the first quarter wave plate 303 is reflected from the polarizing beam splitter 302 back toward the partial mirror 304, and then subsequently reflected at the partial mirror surface 344 toward the eye-ward side 350 of the HMD. As illustrated, this light is labeled [RCP] and [Y] between the partial mirror 304 and the first quarter wave plate 303, and the first quarter wave plate 303 and the polarizing beam splitter 302, respectively. Upon reflection at the partial mirror surface 344, the [RCP] state of the light becomes the [LCP] state before becoming the [X] state upon passing through the first quarter wave plate 303.

Figure 4:
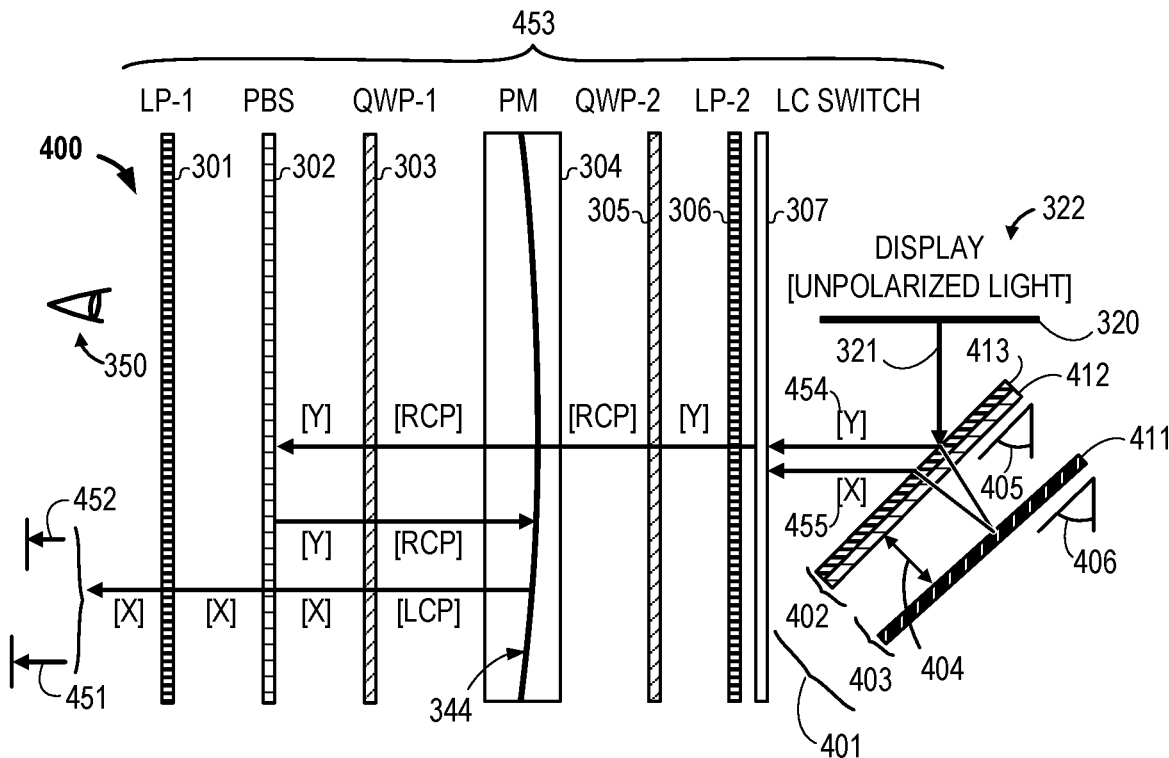
FIG. 4 is a block diagram of a fixed focus catadioptic system providing two focal planes in an HMD according to some embodiments.

FIG. 4 is a block diagram of a fixed focus catadioptic system 400 providing two focal planes in an HMD according to a second embodiment. The system 400 is similar to the system 300 of FIG. 3. The system 400 has a VR arrangement of components and illustrates a lightpath 453 between an electronic display 320 at the first side 322 of the HMD and the eye-ward side 350 of the HMD. From left to right, the components of the system 400 include a first linear polarizer (LP-1) 301, a polarizing beam splitter (PBS) 302, a first quarter wave plate (QWP-1) 303, a partial mirror (PM) 304, a second quarter wave plate (QWP-2) 305, a second linear polarizer (LP-2) 306, a liquid crystal (LC) switch 307, and a beam splitter 401. Unpolarized light 321 is emitted by the electronic display 320 toward the beam splitter 401.

The beam splitter 401 is separated into two portions when compared with the single-bodied beam splitter 330. The beam splitter 401 includes a first component 402 and a second component 403 having a 100% mirror 411. The first component 402 includes a linear polarizer 412 and a PBS film 413. The first component 402 is separated from the second component 403 by a separation distance 404 as measured at a respective first location of the first and second components 402, 403 such as at a first end of each of the first and second components 402, 403. The distance 404 between the components 402, 403 facilitates a difference in length of two lightpaths indicated by the first light state [Y] and the second light state [X], respectively, at a first position 454 and a second position 455 in the system 400. In some embodiments, the first component 402 includes a first optical PPP and the second component 403 includes a second optical PPP to structurally support one or more films or coatings 411-413 thereon.

The first component 402 is oriented at a first angle 405 with respect to the incident display light 321 from the display 320 at the first side 322 of the HMD. The second component 403 is oriented at a second angle 406 with respect to the incident display light 321. Depending on the particular embodiment, the first and second angles 405, 406 are a same angle or a different angle with respect to each other. In some embodiments, the first and second angles 405, 406 are equivalent with respect to the incident display light 321. In other embodiments, these angles 405, 406 are different from each other. Having different angles 405, 406 allows the two virtual images to be re-aligned. The separation of the first and second components 402, 403 allows each component 402, 403 to be physically thinner, which can reduce optical aberrations. In some embodiments, one or more of the components 411-413 are mounted to a substantially transparent medium. In certain embodiments, opposing sides of the transparent medium are angled with respect to one another in a wedge shape where a difference between the angles 405, 406 is sufficient to focus the focal planes 451, 452 at the eye-ward side 350 of the HMD. The angles 405, 405 provide a tilt between at two of the two beam splitter components such as the PBS film 413 and the 100% mirror 411 of the beam splitter 401.

The light 321 output from the display 320 in the system 400 is synchronized with the LC switch 307 to generate content at each of two focal planes 451, 452 at the eye-ward side 350 of the HMD. In some embodiments, the first and second components 402, 403 are adjusted in relation to each other, such as by adjusting one or more of adjusting the angles 405, 406 and distance 404, in order to align the two focal planes 451, 452 at the eye-ward side 350 of the HMD.

Figure 5:
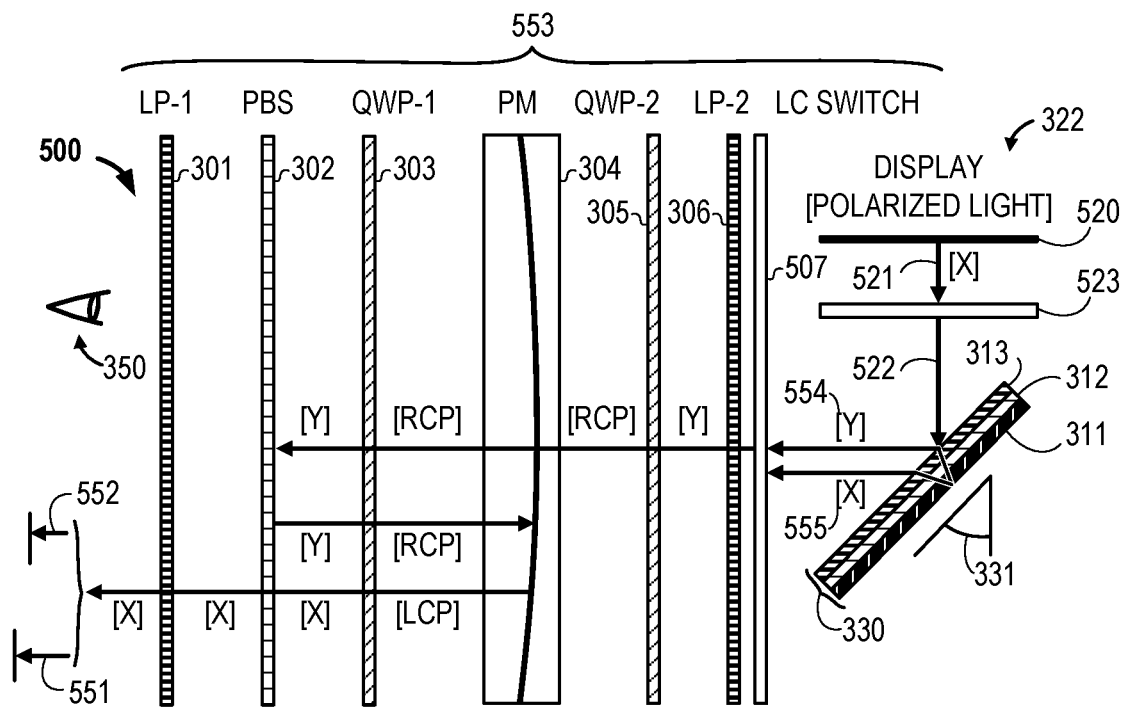
FIG. 5 is a block diagram of a fixed focus catadioptic system providing two focal planes in an HMD according to some embodiments.

FIG. 5 is a block diagram of a fixed focus catadioptic system 500 providing two focal planes in an HMD according to a third embodiment. The system 500 is similar to the system 300 of FIG. 3. The system 500 has a VR arrangement of components and illustrates a lightpath 553 between an electronic display 520 at the first side 322 of the HMD and the eye-ward side 350 of the HMD. From left to right, the components of the system 500 include a first linear polarizer (LP-1) 301, a polarizing beam splitter (PBS) 302, a first quarter wave plate (QWP-1) 303, a partial mirror (PM) 304, a second quarter wave plate (QWP-2) 305, a second linear polarizer (LP-2) 306, a first liquid crystal (LC) switch 507, a beam splitter 330, and a second liquid crystal (LC) switch 523. The beam splitter 330 includes, from bottom to top, a 100% mirror 311, a linear polarizer 312, and a PBS film 313.

In this embodiment, the first and second LC switches 507, 523 are respective liquid crystal layers that are each able to actively rotate the polarization state of the light passing therethrough. For example, the first LC switch 507 and the second LC switch 523 are each a half wave retarder. The display 520, the first LC switch 507, and the second LC switch 523 are electronically synchronized with each other as the HMD operates to provide light at the two focal planes 551, 552 at the eye-ward side 350 of the HMD. The display 520 emits polarized light 521 having a first light state [X] toward the second LC switch 523 in the system 500. In some embodiments, while not illustrated, the polarized 521 is produced by a polarizing layer positioned over a surface of a non-polarized light-emitting display or at least between such display and a next component in the lightpath 553. Light 522 that passes through the second LC switch 523 reaches the beam splitter 330. In some embodiments, one or more of each component of the beam splitter 330 are positioned at an angle with respect to incident display light 321. While shown as a parallel arrangement of components all arranged at a same angle, the beam splitter 330 can have a slight wedge angle between two or more components 311-313 to align or re-align the two focal planes 551, 552 at the eye-ward side 350 of the HMD.

Based on the properties of the PBS film 313, light 522 reaching the beam splitter 330 is split into two types of light along two respective lightpaths that differ in length from the display 520 to the eye-ward side 350 of the HMD. The first path and the second path are at least partially based on the PBS film 313 as indicated by a first light state [Y] and a second light state [X], respectively, at a first position 554 and a second position 555. In some embodiments, the first light state [Y] is linearly polarized along the y-axis as some of the incident light 522 on the PBS film 313 is reflected toward the first LC switch 507. Other light reaching the PBS film 313 passes through to the linear polarizer 312, is incident on the 100% mirror 311, and is reflected back through the linear polarizer 312 and out through the PBS film 313 toward the first LC switch 507. The second light state [X] is different from the first light state [Y] based at least on the PBS film 313 and the linear polarizer 312. Along the lightpath 553, the light states may take the form of one of two orthogonal polarization states—such as a first polarization state in a righthand circular polarized (RCP) state and a second polarization state in a lefthand circular polarized (LCP) state.

Light continues from the beam splitter 330 through the first LC switch 507, the LP-2 306, and the QWP-2 305 before encountering the partial mirror 304. Some of the light that passes through both the partial mirror 304 and the first quarter wave plate 303 is reflected from the polarizing beam splitter 302 back toward the partial mirror 304, and then subsequently reflected at a partial mirror surface of the partial mirror 304 toward the eye-ward side 350 of the HMD. As illustrated, this light is labeled RCP and [Y] between the partial mirror 304 and the first quarter wave plate 303, and the first quarter wave plate 303 and the polarizing beam splitter 302, respectively. Upon reflection at the partial mirror surface, the [RCP] state of the light becomes the [LCP] state before becoming the [X] state upon passing through the first quarter wave plate 303.

Figure 6:
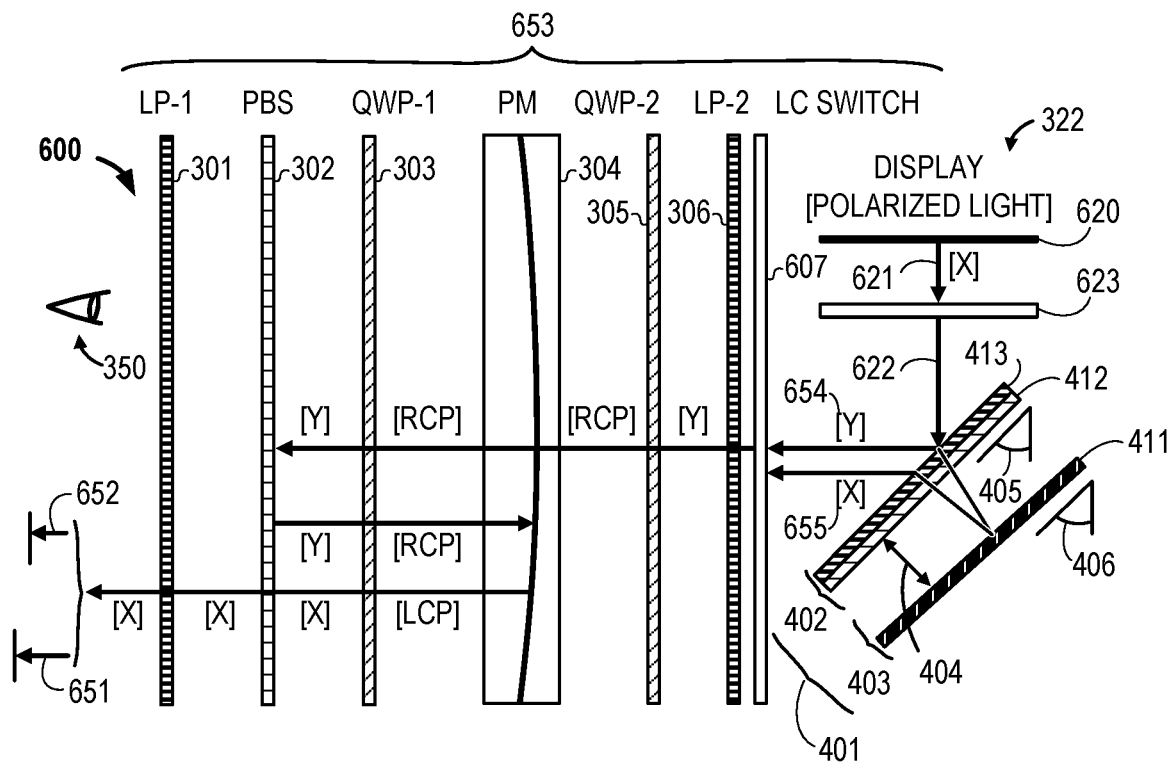
FIG. 6 is a block diagram of a fixed focus catadioptic system providing two focal planes in an HMD according to some embodiments.

FIG. 6 is a block diagram of a fixed focus catadioptic system 600 providing two focal planes in an HMD according to a fourth embodiment. The system 600 is similar to the system 400. The system 600 has a VR arrangement of components and illustrates a lightpath 653 between an electronic display 620 at the first side 322 of the HMD and the eye-ward side 350 of the HMD. From left to right, the components of the system 600 include a first linear polarizer (LP-1) 301, a polarizing beam splitter (PBS) 302, a first quarter wave plate (QWP-1) 303, a partial mirror (PM) 304, a second quarter wave plate (QWP-2) 305, a second linear polarizer (LP-2) 306, a first liquid crystal (LC) switch 607, a beam splitter 401, and a second liquid crystal (LC) switch 623.

The beam splitter 401 is separated into two portions when compared with the single-bodied beam splitter 330. The beam splitter 401 includes a first component 402 and a second component 403 having a 100% mirror 411. The first component 402 includes a linear polarizer 412 and a PBS film 413. The first component 402 is separated from the second component 403 by a separation distance 404 as measured at a respective first location of the first and second components 402, 403 such as at a first end of each of the first and second components 402, 403. The distance 404 between the components 402, 403 facilitates a difference in length of two lightpaths indicated by the first light state [Y] and the second light state [X], respectively, at a first position 654 and a second position 655 in the system 600. The first component 402 is oriented at a first angle 405 with respect to the incident display light 622 from the display 320 that has passed through the second LC switch 623 at the first side 322 of the HMD. The second component 403 is oriented at a second angle 406 with respect to the incident light 622. Depending on the particular embodiment, the first and second angles 405, 406 are a same angle or a different angle with respect to each other. Having different angles 405, 406 and the distance 404 between the first and second components 402, 403 facilitate reduction in aberrations imparted on a secondary x-polarization path of the light reaching the eye-ward side 350 of the HMD of the system 600.

In this embodiment, the first and second LC switches 607, 623 are respective liquid crystal layers that are each able to actively rotate the polarization state of the light passing therethrough. For example, the first LC switch 607 and the second LC switch 623 are each a half wave retarder. The display 620, the first LC switch 607, and the second LC switch 623 are electronically synchronized with each other as the HMD operates to provide light at the two focal planes 651, 652 at the eye-ward side 350 of the HMD. The display 620 emits polarized light 621 having a first light state [X] toward the second LC switch 623 in the system 600. Light 622 that passes through the second LC switch 623 reaches the beam splitter 401.

Based on the properties of the PBS film 413, light 622 reaching the beam splitter 401 is split into two types of light along two respective lightpaths that differ in length from the display 620 to the eye-ward side 350 of the HMD. The first path and the second path are at least partially based on the PBS film 413 as indicated by a first light state [Y] and a second light state [X], respectively, at a first position 654 and a second position 655. In some embodiments, the first light state [Y] is a partially plane polarized quality as some of the incident light 622 on the PBS film 413 is reflected toward the first LC switch 607. Other light reaching the PBS film 413 passes through to the linear polarizer 412, is incident on the 100% mirror 411, and is reflected back through the linear polarizer 412 and out through the PBS film 413 toward the first LC switch 607. The second light state [X] is different from the first light state [Y] based at least on the linear polarizer 412. Along the lightpath 653, the light states may take the form of one of two orthogonal polarization states— such as a first polarization state in a righthand circular polarized (RCP) state and a second polarization state in a lefthand circular polarized (LCP) state as illustrated.

Light continues from the beam splitter 401 through the first LC switch 607, the LP-2 306, and the QWP-2 305 before encountering the partial mirror 304. Some of the light that passes through both the partial mirror 304 and the first quarter wave plate 303 is reflected from the polarizing beam splitter 302 back toward the partial mirror 304, and then subsequently reflected at a partial mirror surface of the partial mirror 304 toward the eye-ward side 350 of the HMD. As illustrated, this light is labeled [RCP] and [Y] between the partial mirror 304 and the first quarter wave plate 303, and the first quarter wave plate 303 and the polarizing beam splitter 302, respectively. Upon reflection at the partial mirror surface, the [RCP] state of the light becomes the [LCP] state before becoming the [X] state upon passing through the first quarter wave plate 303.

Figure 7:
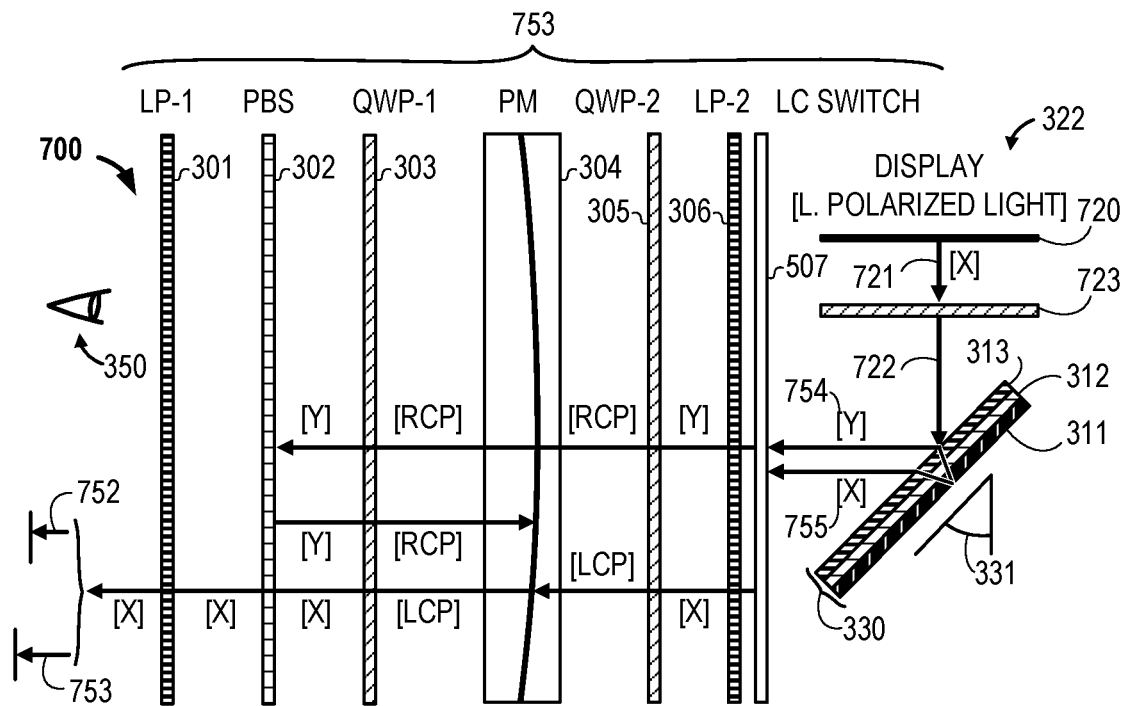
FIG. 7 is a block diagram of a fixed focus catadioptic system providing two focal planes in an HMD according to some embodiments.

FIG. 7 is a block diagram of a fixed focus catadioptic system 700 providing two focal planes in an HMD according to a fifth embodiment. The system 700 is similar to the system 500 except that a third quarter wave plate 723 is positioned in place of the second LC switch 523. The third quarter wave plate 723 produces circularly polarized light 722 from a linearly polarized electronic display 720. The system 700 has a VR arrangement of components and illustrates a lightpath 753 between the display 720 emitting linear polarized light 721 at the first side 322 of the HMD and the eye-ward side 350 of the HMD. The display 720 and the first LC switch 507 are electronically synchronized with each other as the HMD operates to provide light at the two focal planes 751, 752 at the eye-ward side 350 of the HMD over a first path and a second path indicated by a first light state [Y] and a second light state [X], respectively, at a first position 754 and a second position 755. The first path and the second path are at least partially based on the PBS film 313. This system 700 enables an x polarization component and a y polarization component to be sampled at or by the beam splitter 330. In some embodiments, the system 700 and arrangement of its components are less energy efficient than the system 500, but the system 700 has one less actively driven component as this system 700 uses the actively driven display 720 and the actively driven LC switch 507.

Figure 8:
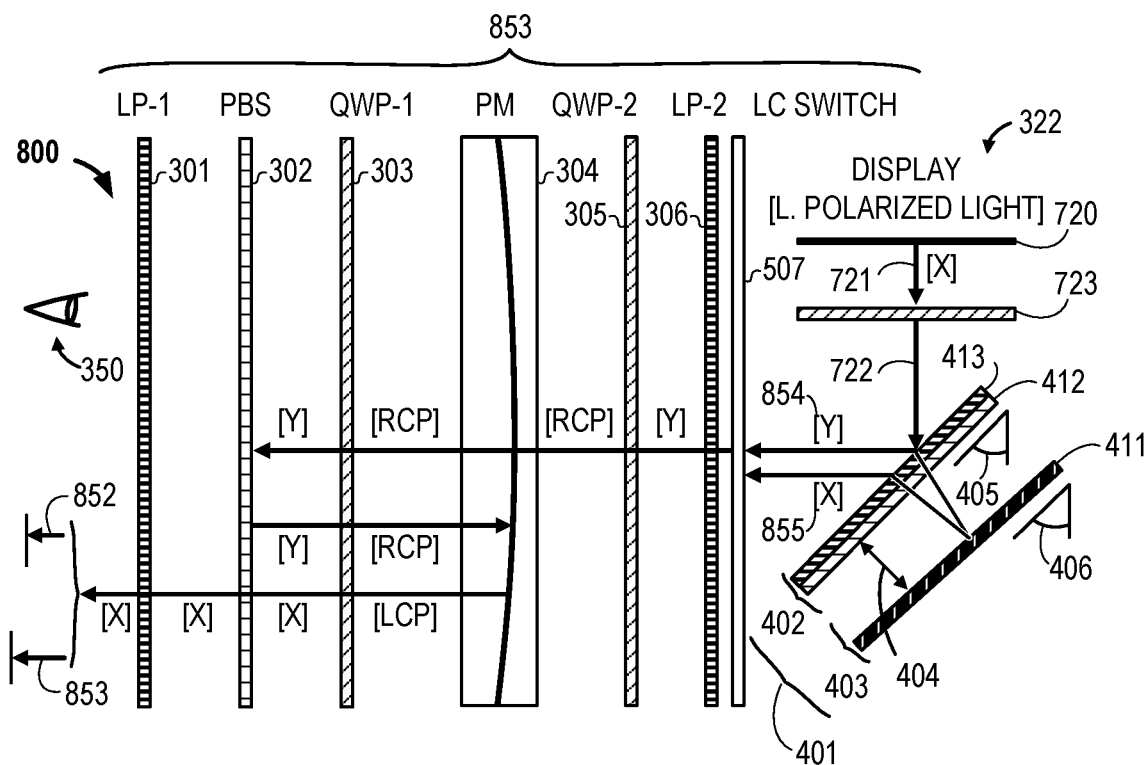
FIG. 8 is a block diagram of a fixed focus catadioptic system providing two focal planes in an HMD according to some embodiments.

FIG. 8 is a block diagram of a fixed focus catadioptic system 800 providing two focal planes in an HMD according to a sixth embodiment. The system 800 is similar to the system 600 except that a third quarter wave plate 723 is positioned in place of the second LC switch 523. The system 800 is also similar to the system 700 except that a divided beam splitter 401 is positioned in place of the beam splitter 330. The third quarter wave plate 723 produces circularly polarized light 722 from a linearly polarized electronic display 720. The system 800 has a VR arrangement of components and illustrates a lightpath 853 between the display 720 emitting linear polarized light 721 at the first side 322 of the HMD and the eye-ward side 350 of the HMD. The display 720 and the first LC switch 507 are electronically synchronized with each other as the HMD operates to provide light at the two focal planes 851, 852 at the eye-ward side 350 of the HMD over a first path and a second path indicated by a first light state [Y] and a second light state [X], respectively, at a first position 854 and a second position 855.

The beam splitter 401 of the system 800 is separated into two portions when compared with the single-bodied beam splitter 330. The beam splitter 401 includes a first component 402 and a second component 403 having a 100% mirror 411. The first component 402 includes a linear polarizer 412 and a PBS film 413. The first path and the second path are at least partially based on the PBS film 413 of the beam splitter 401 and the distance between the first component 402 and the second component 403. This system 800 enables an x polarization component and a y polarization component to be sampled at or by the beam splitter 401. In some embodiments, the system 800 and arrangement of its components are less energy efficient than the system 600, but the system 800 has one less actively driven component since this system 800 uses the actively driven display 720 and the actively driven LC switch 507 instead of driving three components as in other embodiments.

Figure 9:
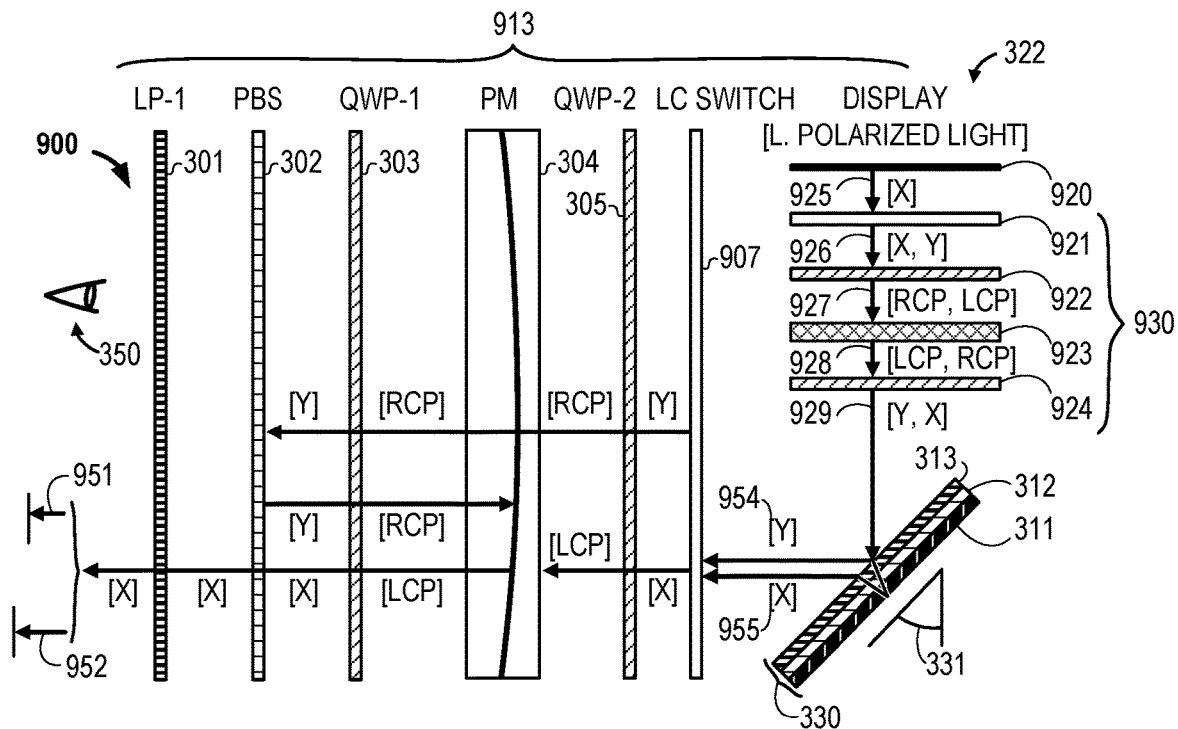
FIG. 9 is a block diagram of a fixed focus catadioptic system providing two focal planes in an HMD according to some embodiments.

FIG. 9 is a block diagram of a fixed focus catadioptic system 900 providing two focal planes in an HMD according to a seventh embodiment. Certain components are positioned along a lightpath 913 between an electronic display 920 at a first side 322 of the system 900 and an eye-ward side 350 of the HMD. From left to right, the components of the system 900 include: a first linear polarizer (LP-1) 301, a polarizing beam splitter (PBS) 302, a first quarter wave plate (QWP-1) 303, a partial mirror (PM) 304, a second quarter wave plate (QWP-2) 305, a first liquid crystal (LC) switch 907, and layers illustrated as grouped in a beam splitter 330. The beam splitter 330 includes, from bottom to top, a 100% mirror 311, a linear polarizer 312, and a PBS film 313. The system 900 also includes a stack 930 of layers or components between the display 920 and the beam splitter 330. The stack 930 includes, from top to bottom, a second liquid crystal (LC) switch 921, a third quarter wave plate 922, a geometric phase (GP) lens 923, and a fourth quarter wave plate 924. The GP lens 923 is a diffractive element that has +/− optical power depending on the input polarization state. That is, with righthanded circularly polarized light, the GP lens 923 produces a first focal length, while lefthanded circularly polarized light presents a focal length with the opposite sign. Unpolarized light produces a positive and negative focal length at the same time. In certain embodiments, both outputs (light waves) are circularly polarized and orthogonal to each other.

Linear polarized light 925 is emitted by the electronic display 920 toward the second LC switch 921. The light 925 is in a first light state [X] before reaching the second LC switch 921. Based on operation of the second LC switch 921, the light passing therethrough remains in the first light state [X] or is placed into a second light state [Y] that is linearly polarized along the y-axis. Light 926 passes from the second LC switch 921 to and through the third quarter wave plate 922, the GP lens 923, and the fourth quarter wave plate 924. In the stack 930, the light 925 originating from the display 920 passes through various light states including the first and second light states [X, Y], the [RCP] state, and the [LCP] state as illustrated between the components of the stack 930. Light 929 leaving the fourth quarter wave plate 924 is in either the second or the first light state [Y, X] and then is incident on the beam splitter 330. The display 920, the first LC switch 907, and the second LC switch 921 are electronically synchronized with each other as the HMD operates to provide light at the two focal planes 951, 952 at the eye-ward side 350 of the HMD over a first path and a second path within the lightpath 913 indicated by the second light state [Y] and the first light state [X], respectively, at a first position 954 and a second position 955. That is, electronically operated components are coordinated in operation to produce different light paths and different light states in the system 900. The first path and the second path are at least partially based on the PBS film 313 of the beam splitter 330 and the components of the stack 930.

In some embodiments, one or more of each component of the beam splitter 330 is positioned at an angle 331 such as a 37-degree angle or a 45-degree angle with respect to incident light 929 originating from the display 920. While shown as a parallel arrangement of components in the beam splitter 330, all arranged at a same angle, the beam splitter 330 of the system 900 can have a slight wedge angle between two or more components 311-313 to align or re-align the two focal planes 951, 952. Based at least on the properties of the PBS film 313 and the stack 930, light 925 originating from the display 920 is split into two types of light along the two respective paths that differ in length from the display 920 to the eye-ward side 350 of the HMD. In some embodiments, the second light state [Y] is linearly polarized along the y-axis as some of the incident light 929 on the PBS film 313 is reflected toward the first LC switch 907. Other light reaching the PBS film 313 passes through to the linear polarizer 312, is incident on the 100% mirror 311, and is reflected back through the linear polarizer 312 and out through the PBS film 313. The first light state [X] at the second position 955 is different from the first light state [Y] at the first position 954 based at least on the linear polarizer 312 and components of the stack 930. Along the lightpath 913, the light states may take the form of one of two orthogonal polarization states—such as a first polarization state in a righthand circular polarized (RCP) state and a second polarization state in a lefthand circular polarized (LCP) state. The RCP and [LCP] states are illustrated as the light 927 between the third quarter wave plate 922 and the GP lens 923, as the light 928 between the GP lens 923 and the fourth quarter wave plate 924, and as the light between the partial mirror 304 and the quarter wave plates 303, 305.

Light continues from the beam splitter 330 through the first LC switch 907 and the second quarter wave plate 305 before encountering the partial mirror 304. The first LC switch 907 and the second LC switch 921 are each a liquid crystal layer able to actively rotate the polarization state of the light passing therethrough. For example, each of the first LC switch 907 and the second LC switch 921 is a half wave retarder. The light 925 output from the display 920 is synchronized with operation of the first LC switch 907 and the second LC switch 921 to generate content at each of two focal planes 951, 952 at the eye-ward side 350 of the HMD. While not illustrated, a backlight is pulsed (e.g., between 10-20% of a duty cycle) after each of the first LC switch 907 and the second LC switch 921 is settled.

Figure 10:
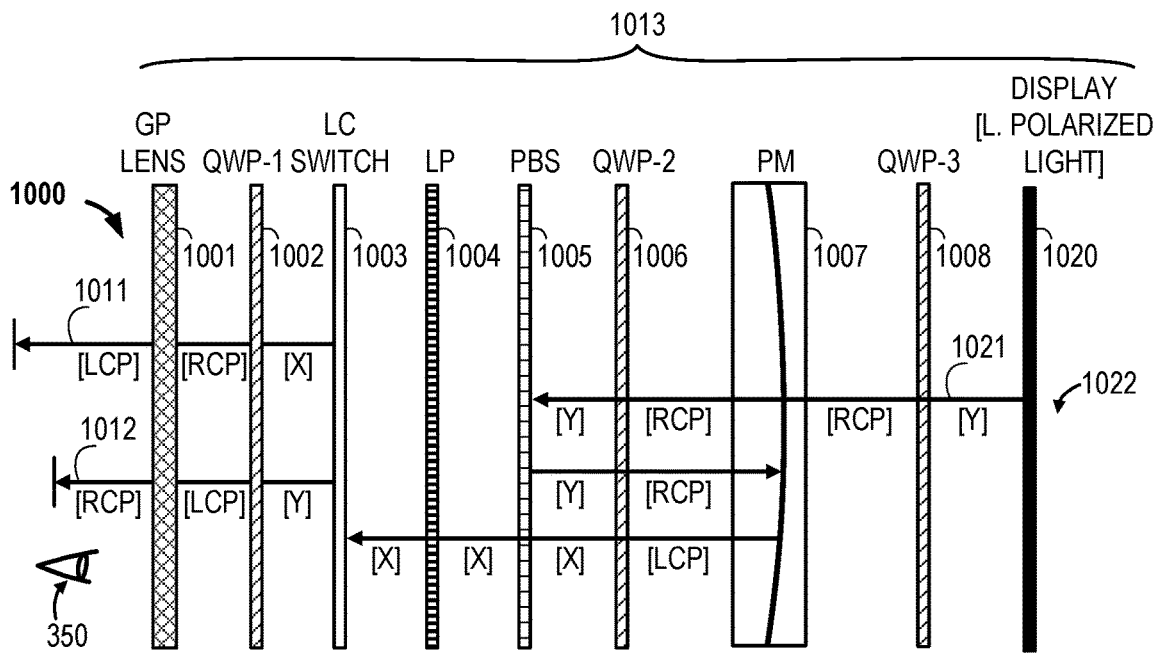
FIG. 10 is a block diagram of a fixed focus catadioptic system providing two focal planes in an HMD according to some embodiments.

FIG. 10 is a block diagram of a fixed focus catadioptic system 1000 providing two focal planes 1011, 1012 in an HMD according to an eighth embodiment. Certain components are positioned along a lightpath 1013 between an electronic display 1020 at a first side 322 of the system 1000 and an eye-ward side 350 of the HMD. From left to right, the components of the system 1000 include: a geometric phase (GP) lens 1001, a first quarter wave plate (QWP-1) 1002, an LC switch 1003, a linear polarizer (LP) 1004, a polarizing beam splitter (PBS) 1005, a second quarter wave plate (QWP-2) 1006, a partial mirror (PM) 1007, a third quarter wave plate (QWP-3) 1008, and the electronic display 1020. These components are positioned from an eye-ward side 350 to a first side 1022 of the HMD.

Linear polarized light 1021 is emitted by the electronic display 1020 toward the third quarter wave plate 1008 in a first light state [Y] that is linearly polarized along the y-axis before passing through the third quarter wave plate 1008, the PM 1007, and the second quarter wave plate 1006 before reaching the PBS 1005. At the PBS 1005, the light is reflected back toward the second quarter wave plate 1006 and passes therethrough and reaches the PM 1007. The PM 1007 reflects the light in an [LCP] state to the second quarter wave plate 1006. Light having passed through the second quarter wave plate 1006 is in second light state [X], which then passes through the PBS 1005, the LP 1004, and the LC switch 1003, and the first quarter wave plate 1002 before reaching the GP lens 1001.

Based on operation of the LC switch 1003, the light passes therethrough and is transformed into the first light state [X] or the second light state [Y] and then through the first quarter wave plate 1002 and the GP lens 1001 to form the first and second focal planes 1011, 1012, respectively, on the eye-ward side 350 of the HMD. In this particular embodiment, no beam splitter is used. Instead, the system 1000 employs the GP lens 1001 and the LC switch 1002 to generate the two focal planes 1011, 1012. In general, a number of focal planes 1011, 1012 goes as $2^n$, where n is the number of GP lens, QWP, and LC switch pairs such as the GP lens 1001 and the LC switch 1002 as a first such pair. The QWP between a GP lens and LC switch converts light back to a linear polarization thereby allowing the LC switch to operate as desired. In the system 1000, the LC switch 1002 is operationally synchronized with the electronic display 1020 emitting linear polarized light.

Figure 11:
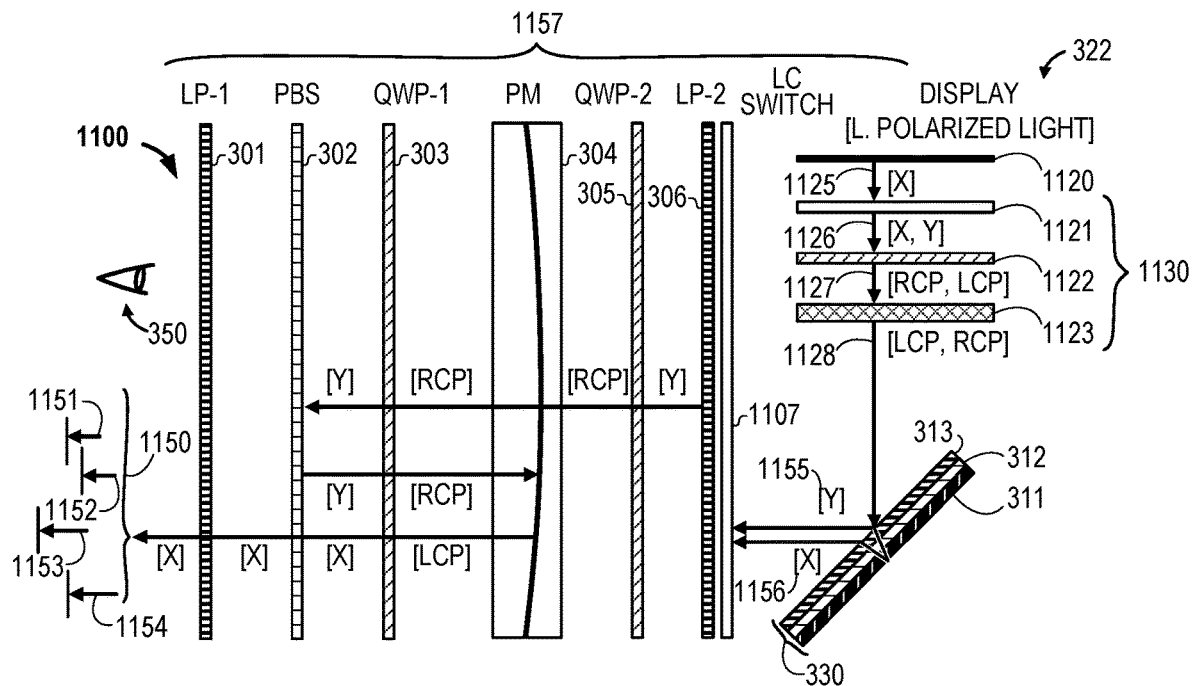
FIG. 11 is a block diagram of a fixed focus catadioptic system providing four focal planes in an HMD according to some embodiments.

FIG. 11 is a block diagram of a fixed focus catadioptic system 1100 providing four focal planes 1151-1154 in an HMD according to some embodiments. Certain components are positioned along a lightpath 1157 between an electronic display 1120 at a first side 322 of the system 1100 and an eye-ward side 350 of the HMD. From left to right, the components of the system 1100 include: a first linear polarizer (LP-1) 301, a polarizing beam splitter (PBS) 302, a first quarter wave plate (QWP-1) 303, a partial mirror (PM) 304, a second quarter wave plate (QWP-2) 305, a second linear polarizer (LP-2) 306, a first liquid crystal (LC) switch 1107, layers illustrated as grouped in a beam splitter 330, and a stack 1130 of layers or components between the display 1120 and the beam splitter 330. The beam splitter 330 includes, from bottom to top, a 100% mirror 311, a linear polarizer 312, and a PBS film 313. The stack 1130 includes, from top to bottom, a second liquid crystal (LC) switch 1121, a third quarter wave plate 1122, and a geometric phase (GP) lens 1123. The GP lens 1123 is a diffractive element that has +/− optical power depending on the input polarization state.

The system 1100 uses the GP lens 1123 to generate light 1128 in LCP and [RCP] states with different focal distances. The beam splitter 330 then splits each of these into X and Y polarization states with different optical path lengths. The first and second LC switches 1107, 1121 then are used to select which of the four display planes 1150 to show at the eye-ward side 350 of the system 1100.

Proceeding step by step, linear polarized light 1125 is emitted by the electronic display 1120 toward the second LC switch 1121. The light 1125 is in a first light state [X] before reaching the second LC switch 1121. Based on operation of the second LC switch 1121, light 1126 passing therethrough remains in the first light state [X] that is linearly polarized along the x-axis or is placed into a second light state [Y] that is linearly polarized along the y-axis. The light 1126 then passes from the second LC switch 1121 to and through the third quarter wave plate 1122 and the GP lens 1123. In the stack 1130, the light 1125 originating from the display 1120 passes through various light states including the first and second light states [X, Y], the [RCP] state, and the [LCP] state as illustrated between the components of the stack 1130. Light 1128 leaving the GP lens 1123 is in either the [RCP] or the [LCP] state and then is incident on the beam splitter 330. The display 1120, the first LC switch 1107, and the second LC switch 1121 are electronically synchronized with each other as the HMD operates to provide light at the four focal planes 1151, 1152, 1153, 1154 at the eye-ward side 350 of the HMD over respective paths within the lightpath 1157 indicated by the second light state [Y] and the first light state [X], respectively, at a second position 1155 and a first position 1156 near the PBS film 313. The four paths are at least partially based on the PBS film 313 of the beam splitter 330, the GP lens 1123, and the first and second LC switches 1107, 1121.

Figure 12:
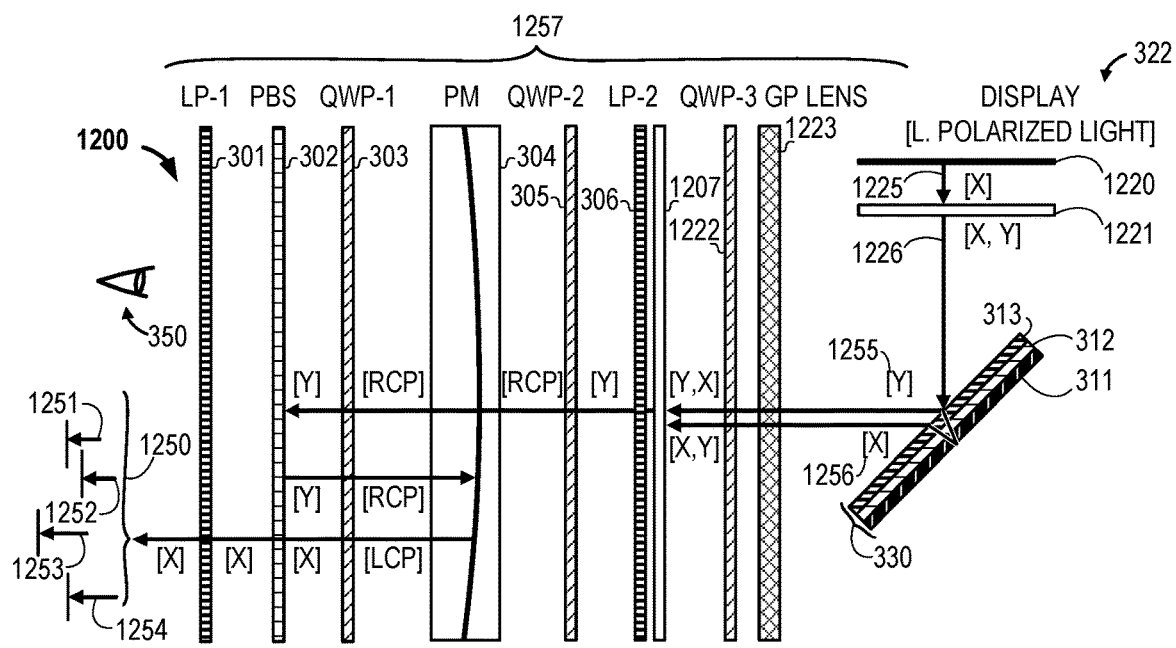
FIG. 12 is a block diagram of a fixed focus catadioptic system providing four focal planes in an HMD according to some embodiments.

FIG. 12 is a block diagram of a fixed focus catadioptic system 1200 providing four focal planes 1251-1254 in an HMD according to some embodiments. Certain components are positioned along a lightpath 1257 between an electronic display 1220 at a first side 322 of the system 1200 and an eye-ward side 350 of the HMD. From left to right, the components of the system 1200 include: a first linear polarizer (LP-1) 301, a polarizing beam splitter (PBS) 302, a first quarter wave plate (QWP-1) 303, a partial mirror (PM) 304, a second quarter wave plate (QWP-2) 305, a second linear polarizer (LP-2) 306, a first liquid crystal (LC) switch 1207, a third quarter wave plate (QWP-2) 1222, a geometric phase (GP) lens 1223, layers illustrated as grouped in a beam splitter 330, and a second LC switch 1221. The beam splitter 330 includes, from bottom to top, a 100% mirror 311, a linear polarizer 312, and a PBS film 313.

In operation, the system 1200 generates linear polarized light at the display 1220. The system 1220 uses the first and second LC switches 1207, 1221 and the GP lens 1223 in combination with the beam splitter 330 and the partial mirror 304 to generate light of different focal distances as the light passes from the display 1220 to the eye-ward side 350 of the HMD. The beam splitter 330 splits light 1226 exiting the second LC switch 1221 in each of the X and Y polarization states so that the light has two different optical path lengths based on the travel into and through the beam splitter 330 and two additional and different optical path lengths based on the partial mirror 304. The first and second LC switches 1207, 1221 and the GP lens 1223 are used to select which of the four display planes 1251-1254 to show at the eye-ward side 350 of the HMD 100. The four display planes 1251-1254 are illustrated as a group 1250 of display planes. Between the third quarter wave plate 1222 and the GP lens 1223, the system 1200 uses the GP lens to generate light in the LCP and [RCP] states.

Proceeding step by step, linear polarized light 1225 is emitted by the electronic display 1220 toward the second LC switch 1221. The light 1225 is in a first light state [X] before reaching the second LC switch 1221. Based on operation of the second LC switch 1221, light 1126 passing therethrough remains in the first light state [X] or is placed into a second light state [Y]. The light 1226 then passes from the second LC switch 1221 to the beam splitter 330. In the beampath 1257, the light 1125 originating from the display 1120 passes through various light states including the first and second light states [X, Y], the [RCP] state, and the [LCP] state as illustrated between the components of the system 1200. Light leaving the GP lens 1223 is in either the [RCP] or the [LCP] state and then is incident on the first LC switch 1207. The display 1220, the first LC switch 1207, and the second LC switch 1221 are electronically synchronized with each other as the HMD operates to provide light at the four focal planes 1251, 1252, 1253, 1254 at the eye-ward side 350 of the HMD over respective light paths within the lightpath 1257 indicated by the second light state [Y] and the first light state [X], respectively, at a second position 1255 and a first position 1256 near the PBS film 313. The four paths are at least partially based on the PBS film 313 of the beam splitter 330, the GP lens 1223, and the first and second LC switches 1207, 1221.

Figure 13:
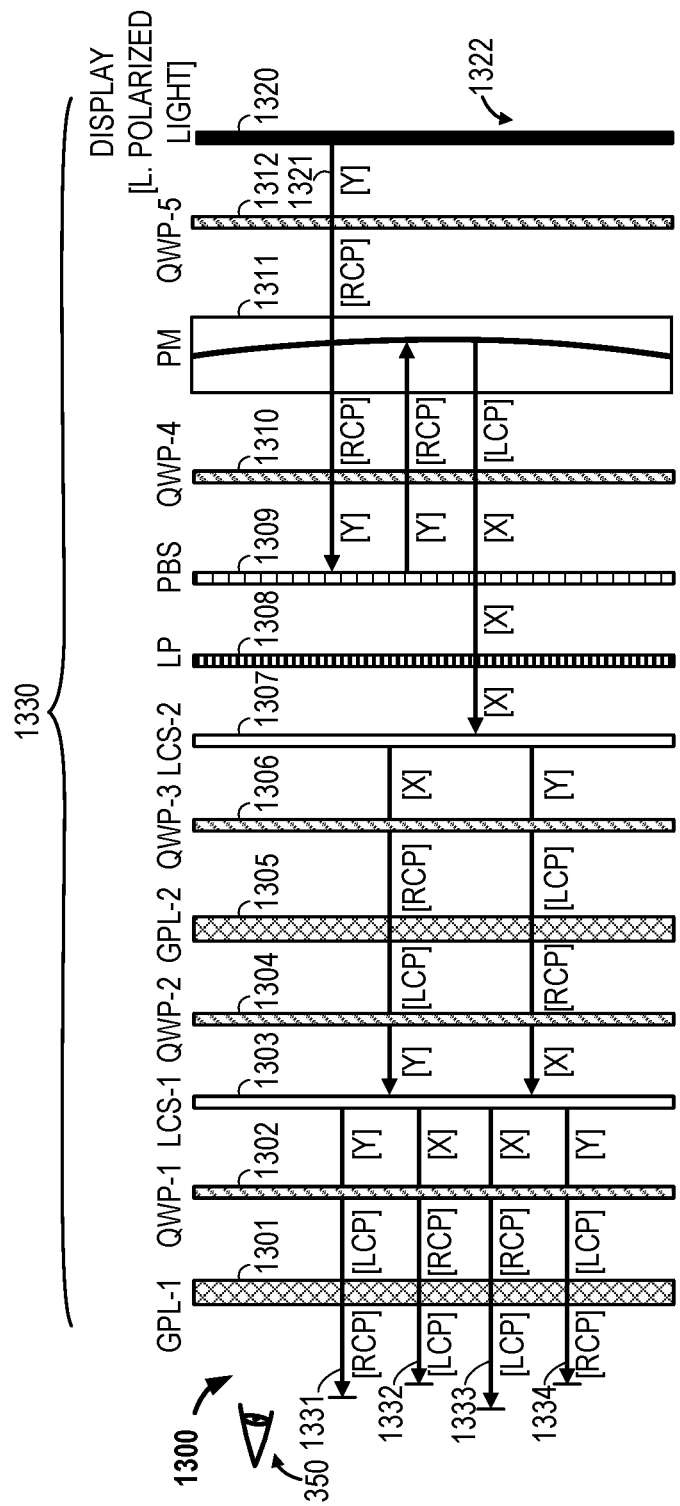
FIG. 13 is a block diagram of a fixed focus catadioptic system providing four focal planes in an HMD according to some embodiments.

FIG. 13 is a block diagram of a fixed focus catadioptic system 1300 providing four focal planes 1331-1334 in an HMD according to some embodiments. Certain components are positioned along a lightpath 1330 between an electronic display 1320 at a first side 1322 of the system 1300 and an eye-ward side 350 of the HMD. From left to right, the components of the system 1300 include: a first GP lens (GPL-1) 1301, a first quarter wave plate (QWP-1) 1302, a first LC switch (LCS-1) 1303, a second quarter wave plate (QWP-2) 1304, a second GP lens (GPL-2) 1305, a third quarter wave plate (QWP-3) 1306, a second LC switch (LCS-2) 1307, a linear polarizer (LP) 1308, a polarizing beam splitter (PBS) 1309, a fourth quarter wave plate (QWP-4) 1310, a partial mirror (PM) 1311, a fifth quarter wave plate (QWP-5) 1312, and the electronic display 1320. These components are positioned from the eye-ward side 350 to the first side 1322 of the HMD.

Linear polarized light 1321 is emitted by the electronic display 1320 toward the fifth quarter wave plate 1312 in a first light state [Y] that is linearly polarized along the y-axis before passing through the fifth quarter wave plate 1312, the PM 1311, and the fourth quarter wave plate 1310 before reaching the PBS 1309. At the PBS 1309, the light incident thereon in the first light state [Y] is reflected back toward the fourth quarter wave plate 1310 and passes therethrough and reaches the partial mirror 1311. The PM 1311 reflects the light in an [LCP] state toward the fourth quarter wave plate 1310. Light having passed through the fourth quarter wave plate 1310 is in a second light state [X], which then passes through the PBS 1309 and the LP 1308 before reaching the second LC switch 1307. Based on the operation of the second LC switch 1307, the light in an [RCP] state leaves the second LC switch 1307 as either light in the [RCP] state or the [LCP] state and is directed toward the third quarter wave plate 1306 as illustrated by two light paths. After passing through the third quarter wave plate 1306, the second GP lens 1305 alters the [RCP] state of the light to the [LCP] state and vice versa. Light in the [RCP] and [LCP] states are altered to the [Y] and the [X] states respectively by the second quarter wave plate 1304. Based on the operation of the first LC switch 1303, light incident on the first LC switch 1303 in the [Y] state leaves the first LC switch 1303 as either light in the [Y] state or the [X] state. In a similar manner, light incident on the first LC switch 1303 in the [X] state leaves the first LC switch 1303 as either light in the [X] state or the [Y] state thereby creating four paths starting at the first LC switch 1303 and directed toward the eye-ward side 350 of the system 1300. Light next passes through the first quarter wave plate 1302 and then through the first GP lens 1301. The first quarter wave plate 1302 transforms the light from the [Y] and [X] states to the [LCP] and [RCP] states, respectively. On the eye-ward side 350 of system 1300, a result of the transformations by the components 1301-1312 is a set of the four focal planes 1331-1334. In particular, based on operation of the first LC switch 1303, the light starting in the [Y] state ahead of the first LC switch 1303 passes therethrough in either the [Y] or the [X] state resulting in the first and second focal planes 1331, 1332. And, based on operation of the first LC switch 1303, the light starting in the [X] state ahead of the first LC switch 1303 passes therethrough in either the [X] or the [Y] state resulting in the third and fourth focal planes 1333, 1334 at the eye-ward side 350 of the HMD.

No beam splitter is used in the lightpath 1330. Instead, the system 1300 employs the first and second GP lenses 1301, 1305 and the first and second LC switches 1303, 1307 in series to generate the four focal planes 1331-1334. In general, a number of focal planes such as the four focal planes 1331-1334 goes as $2^n$, where n is the number of GP lens and LC switch pairs such as the first GP lens 1301 and the first LC switch 1303 as a first pair and the second GP lens 1305 and the second LC switch 1307 as a second pair. In operation, at least the first and second LC switches 1303, 1307 are synchronized with the electronic display 1320 emitting linear polarized light.

Figure 14:
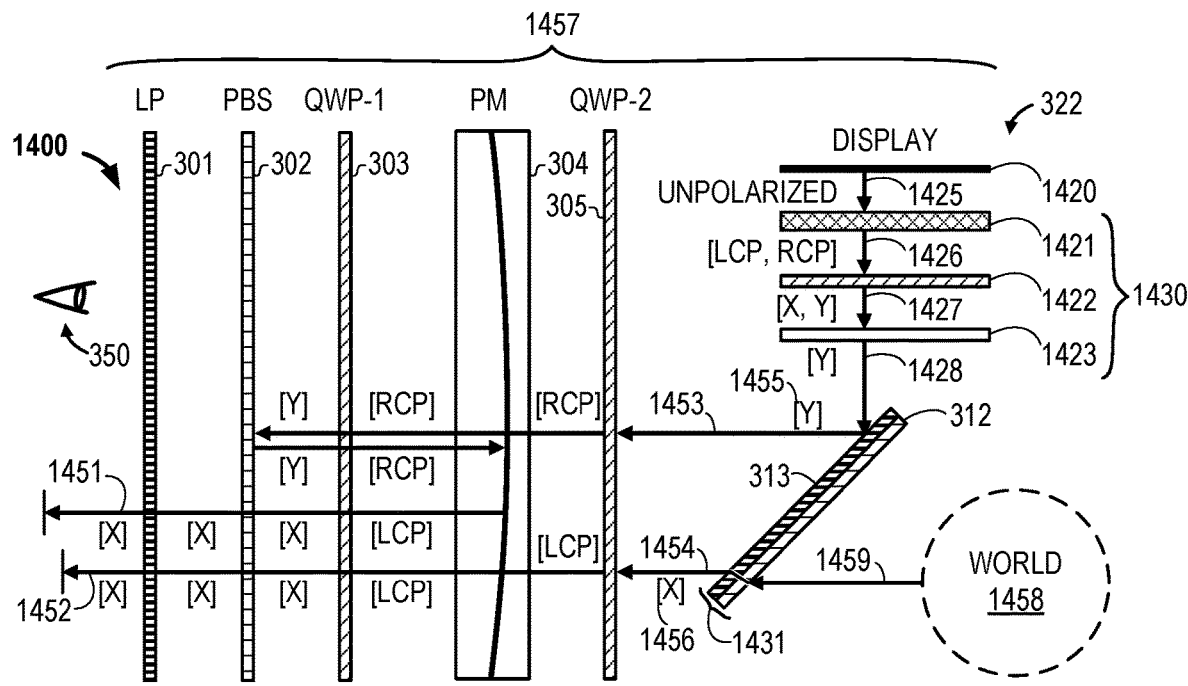
FIG. 14 is a block diagram of a fixed focus catadioptic system providing two focal planes in an HMD according to some embodiments.

FIG. 14 is a block diagram of a fixed focus catadioptic system 1400 providing two focal planes 1451, 1452 in an HMD for augmented reality (AR) applications according to some embodiments. Certain components are positioned along a lightpath 1457 between an electronic display 1420 at a first side 322 of the system 1400 and an eye-ward side 350 of the HMD. From left to right, the components of the system 1400 include: a first linear polarizer (LP-1) 301, a polarizing beam splitter (PBS) 302, a first quarter wave plate (QWP-1) 303, a partial mirror (PM) 304, a second quarter wave plate (QWP-2) 305, layers illustrated as grouped in a beam splitter 1431, and a stack 1430 of layers or components between the display 1420 and the beam splitter 1431. The beam splitter 330 includes, from bottom to top, a linear polarizer 312 and a PBS film 313. The stack 1430 includes, from top to bottom, a geometric phase (GP) lens 1421, a third quarter wave plate 1422, and a liquid crystal (LC) switch 1423.

The system 1400 uses the GP lens 1421 to generate light 1426 in LCP and [RCP] states with different focal distances based on unpolarized light 1425 from the display 1425. The third quarter wave plate 1422 converts the light 1426 from the GP lens 1421 to light 1427 having a first state [X] or a second state [Y] based on the light 1426 in the LCP and [RCP] states. The LC switch 1423 facilitates light in the second state [Y] to pass therethrough and to impact the beam splitter 1431. The beam splitter 1431 then reflects the incident light 1428 into at least one path that includes light 1453 having a [Y] polarization state 1455 and being directed toward the second quarter wave plate 305. Any light reflected into the PBS film 313 would pass into a world side of the system 1400 away from the beam splitter 1431 and away from the eye-ward side 350 of the HMD. Light 1459 from the world 1458 passes into and through the linear polarizer 312 and the PBS film 313 of the beam splitter 1431 and exits therefrom as light 1454 along a second light path in the [X] state 1456. Thus, light 1453 based on light 1425 emitted from the display 1420 and light 1454 based on light from the world 1458 is incident on the second quarter wave plate 305 and are a start of light traveling along two different light paths to reach the eye-ward side 350 of the HMD.

Light in the RCP and [LCP] states exits from the second quarter wave plate 305 and passes into and through the partial mirror 304 when traveling toward the eye-ward side 350 of the system 1400. Light in the [LCP] state passes through the partial mirror 304, the first quarter wave plate 303, the PBS film 302, and the linear polarizer 301 without reflection by the partial mirror 304 before reaching the eye-ward side 350 as light of a second plane focal plane 1452. Light in the [RCP] state passes through the partial mirror 304 and the first quarter wave plate 303, but is reflected by the PBS film 302 back toward the partial mirror 304. The partial mirror 304 is constructed to reflect light in the [RCP] state toward the eye-ward side 350 of the HMD. The light in the [RCP] state traveling from the PBS film 302, after passing through the first quarter wave plate 303, is reflected into the [LCP] state by the partial mirror 304 and then again passes through the first quarter wave plate 303, the PBS film 302, and the linear polarizer 301 before reaching the eye-ward side 350 as light of a first plane focal plane 1451. Light thereby reaches the eye-ward side 350 of the HMD in the [X] state at two different focal planes 1451, 1452 based on light paths of different optical path lengths as light travels to the eye-ward side 350 based on light from both the display 1420 and the world 1458.

Figure 15:
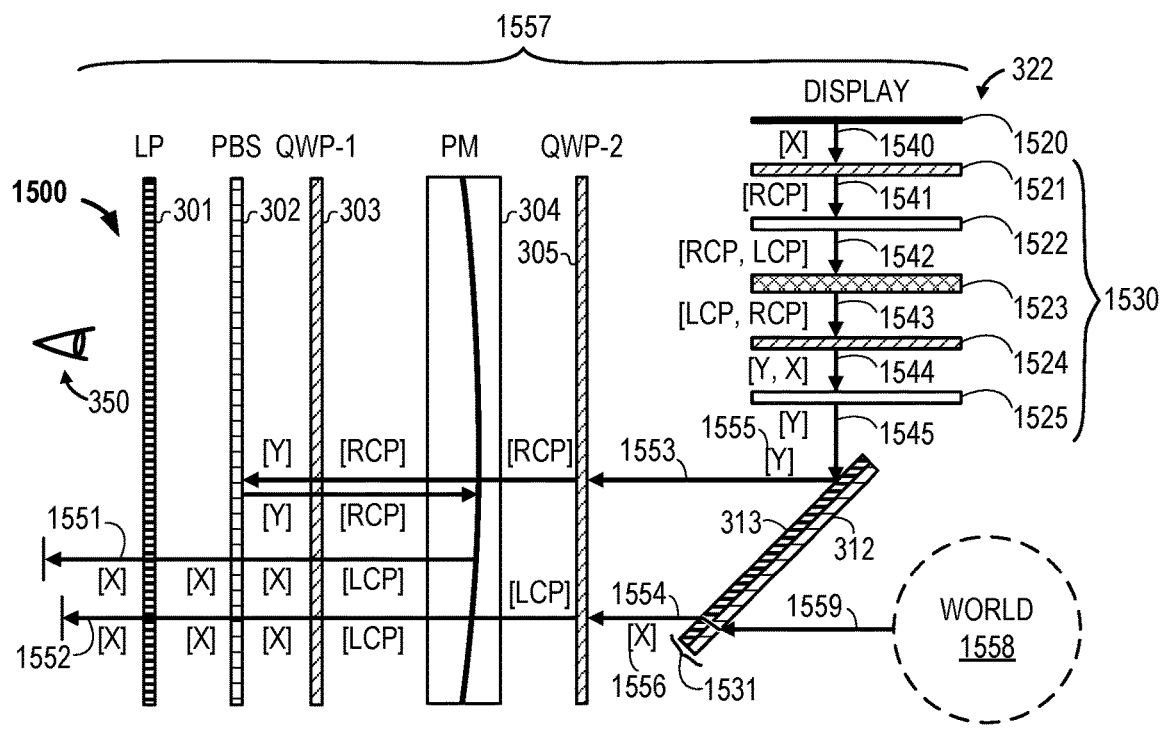
FIG. 15 is a block diagram of a fixed focus catadioptic system providing two focal planes in an HMD according to some embodiments.

FIG. 15 is a block diagram of a fixed focus catadioptic system 1500 providing two focal planes 1551, 1552 in an HMD for AR applications according to some embodiments. Certain components are positioned along a lightpath 1557 between an electronic display 1520 at a first side 322 of the system 1500 and an eye-ward side 350 of the HMD. From left to right, the components of the system 1500 include: a first linear polarizer (LP-1) 301, a polarizing beam splitter (PBS) 302, a first quarter wave plate (QWP-1) 303, a partial mirror (PM) 304, a second quarter wave plate (QWP-2) 305, layers illustrated as grouped in a beam splitter 1531, and a stack 1530 of components between the display 1520 and the beam splitter 1531. The beam splitter 330 includes, from bottom to top, a linear polarizer 312 and a PBS film 313. The stack 1530 includes, from top to bottom, a third quarter wave plate 1521, a first liquid crystal (LC) switch 1522, a geometric phase (GP) lens 1523, a fourth quarter wave plate 1524, and a second LC switch 1525.

The display 1520 generates linear polarized light 1540 in a first light state [X] and directs the light 1540 toward the third quarter wave plate 1521. Light 1541 leaving the third quarter wave plate 1521 is directed to the first LC switch 1522. Light passing therethrough is converted by the first LC switch 1522 to light 1542 in RCP and [LCP] states. The GP lens 1523 converts light passing therethrough to light 1543 in LCP and [RCP] states, respectively. The fourth quarter wave plate 1524 produces light 1544 of a second polarized state [Y] and the first light state [X], respectively.

The second LC switch 1525 produces light 1545 in the second state [Y] and directs this light 1545 toward the beam splitter 1531. The PBS film 313 of the beam splitter 1531 reflects the incident light 1545 into at least one path that includes light 1553 having the second [Y] polarization state 1555 and this light 1553 is directed toward the second quarter wave plate 305. Any light reflected into the PBS film 313 would pass into a world side of the system 1500 away from the beam splitter 1531 and away from the eye-ward side 350 of the HMD. Light 1559 from the world 1558 passes into and through the linear polarizer 312 and the PBS film 313 of the beam splitter 1531 and exits therefrom as light 1554 along a second light path in the [X] state 1556. Thus, light 1553 based on light 1540 emitted from the display 1520 and light 1554 based on light 1559 from the world 1558 is incident on the second quarter wave plate 305 and these two sources of light 1553, 1554 in the [Y] and [X] states, respectively, are part of light traveling along two different light paths to reach the eye-ward side 350 of the HMD.

Light in the RCP and [LCP] states, respectively, exits from the second quarter wave plate 305 and passes through the partial mirror 304 traveling toward the eye-ward side 350 of the system 1500. Light in the [LCP] state passes through the partial mirror 304, the first quarter wave plate 303, the PBS film 302, and the linear polarizer 301 without reflection by the partial mirror 304 before reaching the eye-ward side 350 as light of a second plane focal plane 1552. Light in the [RCP] state passes through the partial mirror 304 and the first quarter wave plate 303, but is reflected by the PBS film 302 back toward the partial mirror 304. The partial mirror 304 is constructed to reflect light in the [RCP] state toward the eye-ward side 350 of the HMD. The light in the [RCP] state traveling from the PBS film 302, after passing through the first quarter wave plate 303, is reflected into the [LCP] state by the partial mirror 304 and then again passes through the first quarter wave plate 303, the PBS film 302, and the linear polarizer 301 before reaching the eye-ward side 350 as light of a first plane focal plane 1551. Light thereby reaches the eye-ward side 350 of the HMD in the [X] state at the two different focal planes 1551, 1552 based on light paths of respective different optical path lengths as light travels to the eye-ward side 350 based on light 1540, 1559 from both the display 1520 and the world 1558.

Figure 16:
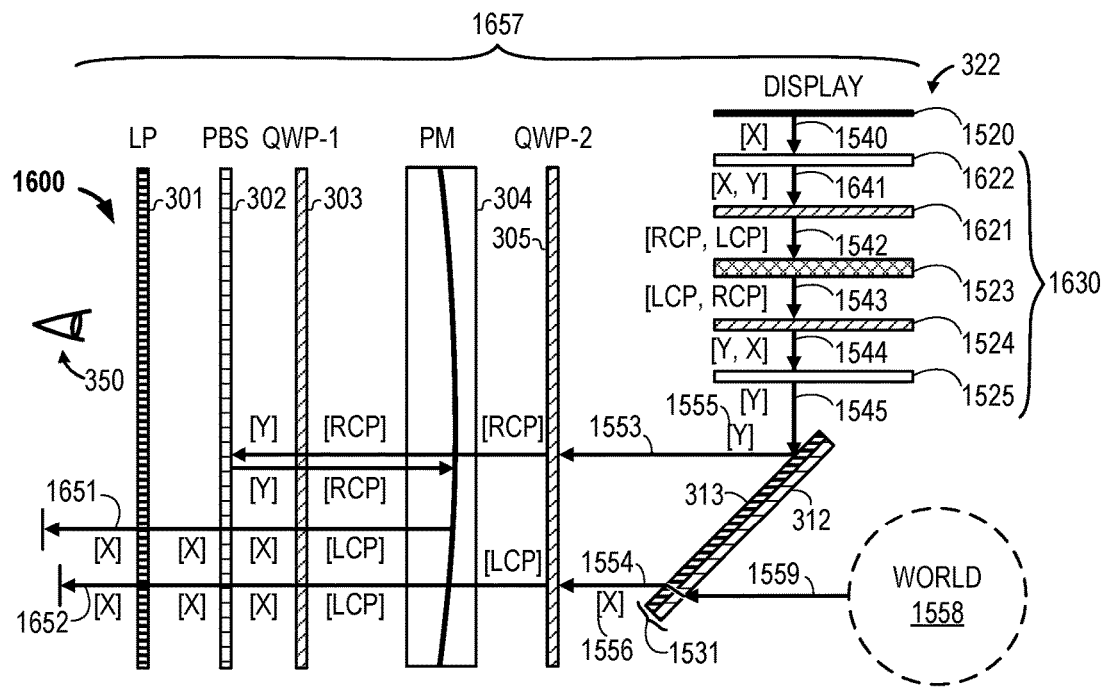
FIG. 16 is a block diagram of a fixed focus catadioptic system providing two focal planes in an HMD according to some embodiments.

FIG. 16 is a block diagram of a fixed focus catadioptic system 1500 providing two focal planes 1551, 1552 in an HMD for AR applications according to other embodiments. Certain components are positioned along a lightpath 1657 between an electronic display 1520 at a first side 322 of the system 1600 and an eye-ward side 350 of the HMD. From left to right, the components of the system 1600 include: a first linear polarizer (LP-1) 301, a polarizing beam splitter (PBS) 302, a first quarter wave plate (QWP-1) 303, a partial mirror (PM) 304, a second quarter wave plate (QWP-2) 305, layers illustrated as grouped in a beam splitter 1531, and a stack 1630 of components between the display 1520 and the beam splitter 1531. The beam splitter 330 includes, from bottom to top, a linear polarizer 312 and a PBS film 313. The stack 1630 is similar the stack 1530 of the system 1500 except that two components are switched in position. In particular, a first LC switch 1622 is positioned directly after the display 1520 on the first side 322 of the HMD. The stack 1630 includes, from top to bottom, the first LC switch 1622, a third quarter wave plate 1621, a GP lens 1523, a fourth quarter wave plate 1524, and a second LC switch 1525. The display 1520 generates linear polarized light 1540 in a first light state [X] and directs the light 1540 toward the first LC switch 1622. Light 1641 from the first LC switch 1622 passes to the third quarter wave plate 1621. Light passing therethrough is changed to light 1542 in RCP and [LCP] states. The GP lens 1523 converts light passing therethrough to light 1543 in LCP and [RCP] states, respectively. The fourth quarter wave plate 1524 produces light 1544 of a second polarized state [Y] and the first light state [X], respectively.

The second LC switch 1525 of the system 1600 produces light 1545 in the second state [Y] and directs this light 1545 toward the beam splitter 1531. The PBS film 313 of the beam splitter 1531 reflects the incident light 1545 into at least one path that includes light 1553 having the second [Y] polarization state 1555 and is directed toward the second quarter wave plate 305. Light 1559 from the world 1558 passes into and through the linear polarizer 312 and the PBS film 313 of the beam splitter 1531 and exits therefrom as light 1554 along a second light path in the [X] state 1556. Thus, light 1553 based on light 1540 emitted from the display 1520 and light 1554 based on light 1559 from the world 1558 is incident on the second quarter wave plate 305 and these two sources of light 1553, 1554 in the [Y] and [X] states, respectively, are part of light traveling along two different light paths to reach the eye-ward side 350 of the HMD.

Light in the RCP and [LCP] states, respectively, exits from the second quarter wave plate 305 and passes through the partial mirror 304 traveling toward the eye-ward side 350 of the system 1600. Light in the [LCP] state passes through the partial mirror 304, the first quarter wave plate 303, the PBS film 302, and the linear polarizer 301 without reflection by the partial mirror 304 before reaching the eye-ward side 350 as light of a second plane focal plane 1652. Light in the [RCP] state passes through the partial mirror 304 and the first quarter wave plate 303, but is reflected by the PBS film 302 back toward the partial mirror 304. The partial mirror 304 is constructed to reflect light in the [RCP] state toward the eye-ward side 350 of the HMD. The light in the [RCP] state traveling from the PBS film 302, after passing through the first quarter wave plate 303, is reflected into the [LCP] state by the partial mirror 304 and then again passes through the first quarter wave plate 303, the PBS film 302, and the linear polarizer 301 before reaching the eye-ward side 350 as light of a first plane focal plane 1651. Light thereby reaches the eye-ward side 350 of the HMD in the [X] state at the two different focal planes 1651, 1652 based on light paths of respective different optical path lengths as light travels to the eye-ward side 350 based on light 1540, 1559 from both the display 1520 and the world 1558 for the system 1600.

Figure 17:
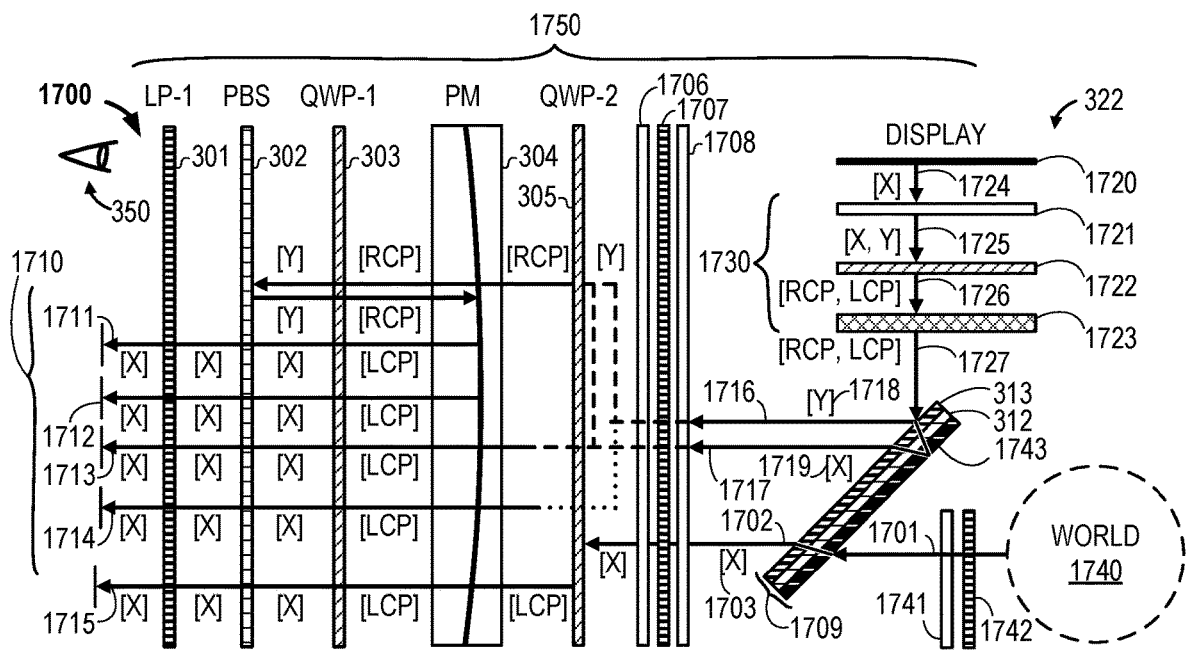
FIG. 17 is a block diagram of a fixed focus catadioptic system providing multiple focal planes in an HMD according to some embodiments.

FIG. 17 is a block diagram of a fixed focus catadioptic system 1700 providing at least four focal planes in an HMD for AR applications according to some embodiments. Certain components are positioned along a lightpath 1750 between an electronic display 1720 at a first side 322 of the system 1700 and a second, eye-ward side 350 of the HMD. From left to right, the components of the system 1700 include: a first linear polarizer (LP-1) 301, a polarizing beam splitter (PBS) 302, a first quarter wave plate (QWP-1) 303, a partial mirror (PM) 304, a second quarter wave plate (QWP-2) 305, a first LC switch 1706, a second linear polarizer 1707, a second LC switch 1708, layers illustrated as grouped in a beam splitter 1709, and a stack 1730 of components between the display 1720 and the beam splitter 1709. The beam splitter 1709 includes, from bottom to top, a 50% mirror 1743, a third linear polarizer 312, and a PBS film 313. The stack 1730 includes, from top to bottom, a third LC switch 1721, a third quarter wave plate 1722, and a geometric phase (GP) lens 1723. The system also includes a fourth LC switch 1741 and a fourth linear polarizer 1742.

The display 1720 generates linear polarized light 1724 in a first light state [X] and directs the light 1724 toward the third LC switch 1721. Light 1725 leaving the third LC switch 1721 is directed to the third quarter wave plate 1722 and the light 1725 is in either the first light state [X] or a second light state [Y]. Light passing through the third quarter wave plate 1722 is converted by the third quarter wave plate 1722 to light 1726 to RCP and [LCP] states. The GP lens 1723 converts light passing therethrough to light 1727 in LCP and [RCP] states, respectively. The GP lens 1723 directs this light 1727 toward the beam splitter 1709. The PBS film 313 of the beam splitter 1709 reflects at least some of the incident light 1727 into at least two paths: a first path that includes light 1716 having the second [Y] polarization state 1718 and this light 1716 is directed toward the second LC switch 1708; and a second path that includes light reflected into the beam splitter 1709. This second path includes the third linear polarizer 312 and the 50% mirror 1743. Some of the light incident on the 50% mirror 1743 is reflected back through the third linear polarizer 312 and out through the PBS film 313, and is directed as light 1717 having the first polarization state [X] 1719. This light 1717 is incident on the second LC switch 1708.

The system 1700 also includes light 1701 from the world 1740 that has passed into and through the fourth linear polarizer 1742 and the fourth LC switch 1741, respectively, and then through the 50% mirror 1743, the linear polarizer 312, and the PBS film 313 of the beam splitter 1709. Light 1702 exiting the beam splitter 1709 and originating from the world 1740 is in the first light state [X] 1703 and is incident on the second LC switch 1708. Light 1702 incident on the second LC switch 1708 in the first light state [X] and originating from the world 1740, depending on operation of the first and second LC switches 1706, 1708, passes therethrough and through the partial mirror 304, the first quarter wave plate 303, the PBS film 302, and the first linear polarizer 301 to reach the eye-ward side 350 of the system 1700 as a fifth lightpath 1715. While not illustrated, based on operation of one or more of the first and second LC switches 1706, 1708, light 1702 originating from the world 1740 is converted into the second light state [Y] and then passed through a longer path as indicated by the light incident on the second quarter wave plate 305 in the second light state [Y].

Based on operation of at least the first, second, and third LC switches 1706, 1708, 1721, light 1724 originating from the display 1720 is directed into one of four lightpaths 1710 indicated at the eye-ward side 350 of the HMD. Each of these paths has a different light path length based on operation of at least some of the beam splitter 1709, the partial mirror 304, and the first, second, and third LC switches 1706, 1708, 1721. For example, a first focal plane 1711 is based on incident light 1716 in the second light state [Y] 1718 from light 1727 reflecting from the PBS film 313. The incident light 1716 passes through the second quarter wave plate 305 and then is eventually reflected from a reflective surface of the partial mirror 304 and passes out through the first quarter wave plate 303, the first PBS film 302, and the first linear polarizer 301. A second focal plane 1712 is based on light 1717 in the first light state [X] 1719 incident on the second LC switch 1708. Based on operation of one or more of the first and second LC switches 1706, 1708, the light reflected from the 50% mirror 1743 is transformed into the second light state [Y] and is eventually reflected from a reflective surface of the partial mirror 304 and passes out through the first quarter wave plate 303, the first PBS film 302, and the first linear polarizer 301 in a similar fashion as the first focal plane 1711. A third focal plane 1713 is based on light 1717 in the first light state [X] 1719 incident on the second LC switch 1708 that passes through the first and second LC switches 1706, 1708 without transformation into another state when incident on the second quarter wave plate 305. A fourth focal plane 1714 is based on light 1716 in the second light state 1718 incident on the second LC switch 1708.

Based on operation of one or more of the first and second LC switches 1706, 1708, the light 1716 is converted into light in the first light state [X] and passes non-reflectively through the second quarter wave plate 305, the partial mirror 304, the first quarter wave plate 303, the PBS film 302, and the first linear polarizer 301 to reach the eye-ward side 350 of the system 1700. The paths of the third focal plane 1713 and the fourth focal plane 1714 are similar except for reflection by the 50% mirror 1743 and operation of one or more of the first and second LC switches 1706, 1708. Light reaches the eye-ward side 350 of the HMD in the [X] state at a plurality of different focal planes 1711-1715 based on light paths of respective different optical path lengths as light travels to the eye-ward side 350 based on light 1724, 1701 from both the display 1720 and the world 1740.

Figure 18:
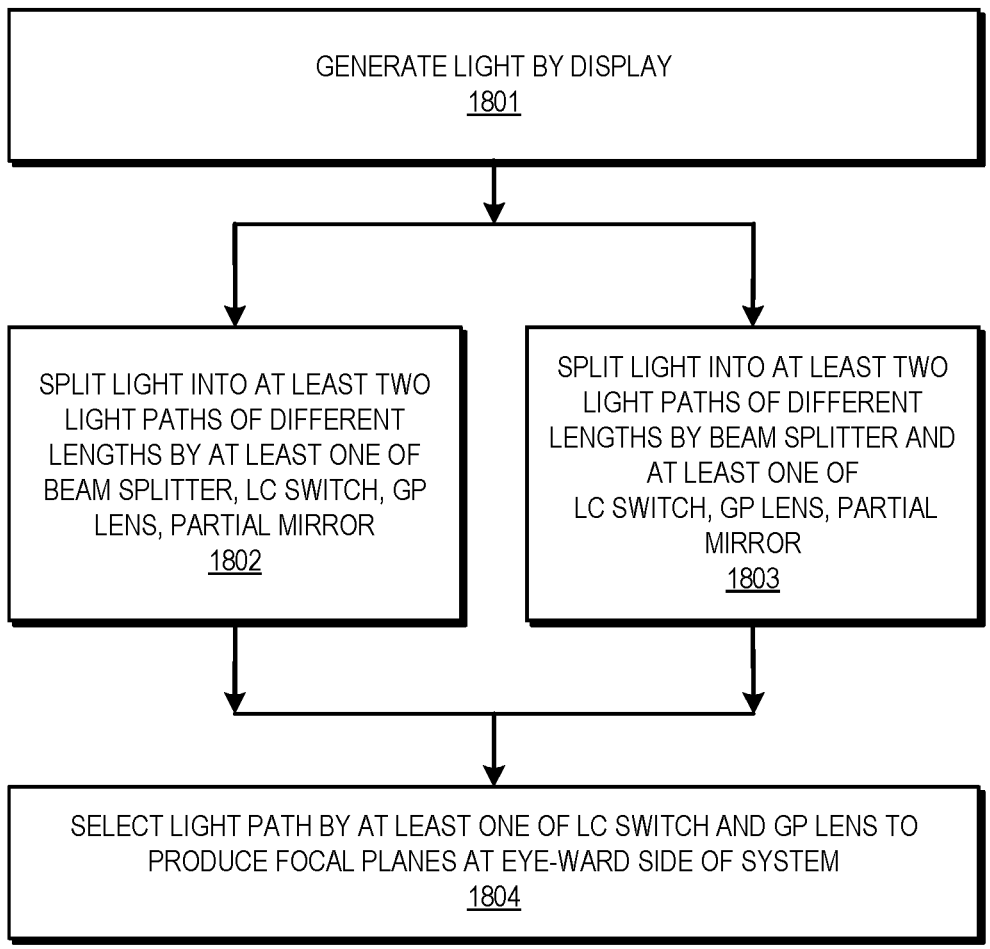
FIG. 18 is a block diagram illustrating a method for providing multiple focal planes in an HMD according to some embodiments.

FIG. 18 is a block diagram illustrating a method 1800 for providing multiple focal planes in an HMD system according to some embodiments. At block 1801, the HMD system provides light by an electronic display such as the display 102. At block 1802, the HMD system splits at least light from the electronic display into at least two light paths of different lengths or different light states by at least one of a beam splitter, an LC switch, a GP lens, and a partial mirror as illustrated and described in relation to FIGS. 1, 2, 10, and 13. Alternatively, at block 1803, the HMD system splits at least light from the electronic display into at least two light paths of different lengths or different states by at least a beam splitter and at least one of an LC switch, a GP lens, and a partial mirror as illustrated and described in relation to FIGS. 1-9, 11, 12, and 14-17. At block 1804, the HMD system selects a light path by at least one of an LC switch and an GP lens to produce, at a particular time, a focal plane at an eye-ward side of the HMD system. In operation, the HMD system provides multiple light paths substantially simultaneously to eyes of a user.

Figure 19:
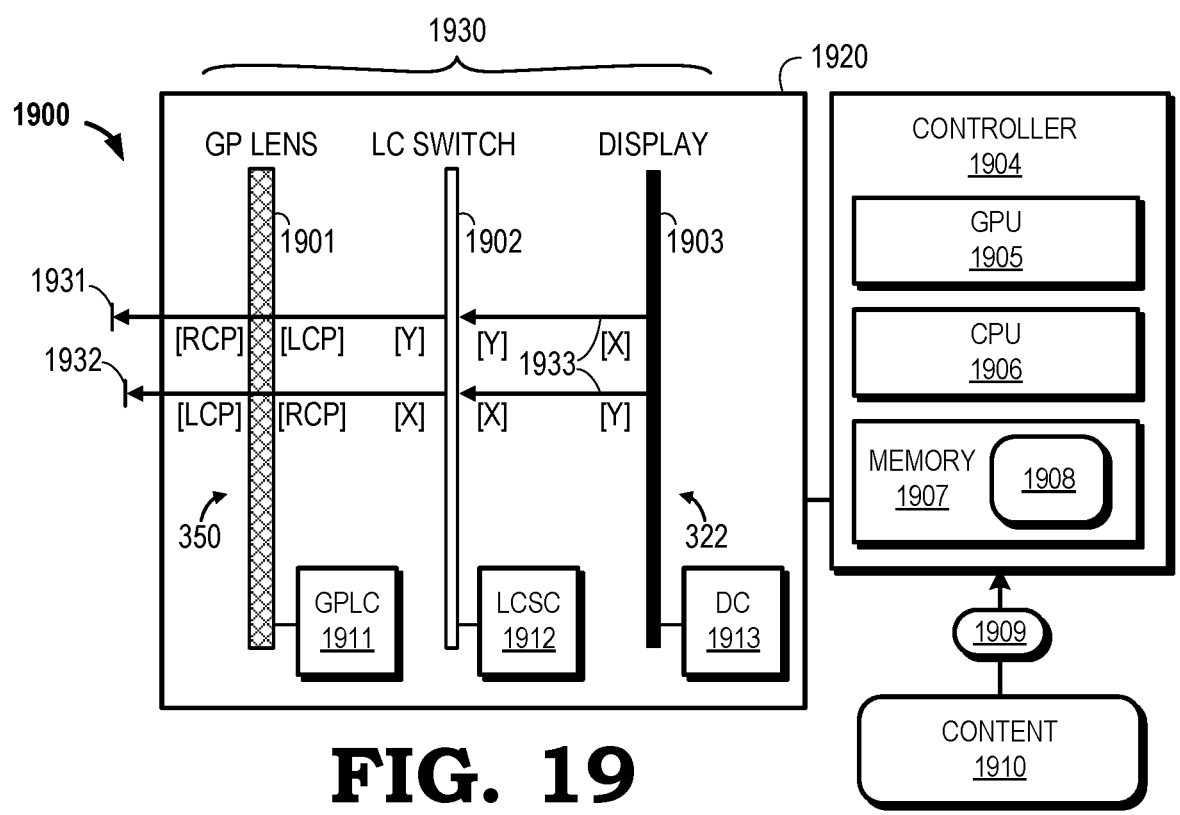
FIG. 19 is a block diagram illustrating a device for providing multiple focal planes according to some embodiments.

FIG. 19 is a block diagram illustrating a device 1900 for providing multiple focal planes according to some embodiments. For sake of convenience of illustration, certain components of the device 1900 are omitted. The device 1900 includes a display subsystem 1920 such as the subsystem 116 of an HMD, and a controller 1904 for the display subsystem 1920. The display subsystem 1920 includes a plurality of electronic components including a GP lens 1901, an LC switch 1902, and a display 1903. The display subsystem 1920 also includes three controllers 1911-1913, one for each of the GP lens 1901, the LC switch 1902, and the display 1903, respectively. A GP lens controller (GPLC) 1911 operates or controls the GP lens 1901. An LC switch controller (LCSC) 1912 operates the LC switch 1902, and a display controller (DC) 1913 operates the display 1903. The display subsystem 1920 provides a lightpath 1930 from the display 1903 at a first side 322 to a second side 350 of the device 1900 at a distal side of the GP lens 1901. Operations of the GP lens controller 1911, the LC switch controller 1912, and the display controller 1913 are coordinated so as to provide at least two focal planes 1931, 1932 at the second side of the device 1900. While the controller 1904 is illustrated adjacent to the display subsystem 1920, in certain embodiments, the two components are physically separated from each other and communicate with each other via one or more wires or wirelessly. In at least some embodiments, components of at least the display subsystem 1920 are mounted to structures of a head mounted device to place the display subsystem 1920 proximate to eyes of a user (not illustrated).

As shown in FIG. 19, the controller 1904 includes a set of one or more processors, such as the illustrated graphics processing unit (GPU) 1905 and the central processing unit (CPU) 1906. The controller 1904 also includes one or more storage components, such as a memory 1907, to store software programs or other executable instructions that are accessed and executed by the processors 1905, 1906 so as to manipulate the one or more of the processors 1905, 1906 to perform various tasks as described herein. Such software programs include, for example, a rendering program 1908 including executable instructions for providing content to the display 1903.

In operation, the controller 1904 receives rendering information 1909 (e.g., display content) from a local or remote content source 1910, where the rendering information 1909 represents graphics data, video data, or other data representative of an object or scene that is the subject of imagery to be rendered and displayed at the display subsystem 1920. Executing the rendering program 1908, the CPU 1906 uses the rendering information 1909 to send instructions to the GPU 1905 or directly to the display subsystem 1920. As part of this rendering process, the CPU 1906 may receive pose information from an inertial management unit (IMU) (not illustrated), whereby the pose information is representative of a pose of the display subsystem 1920 and control the rendering of one or more lightfield frames at the display 1903 to reflect a viewpoint of an object or scene from the pose on the display panel 1903. The pose information includes at least a location in space and an orientation relative to the location thereby providing six aspects of visual data.

When received, the display subsystem 1920 provides instructions to the display 1903, the LC switch 1902, and the GP lens 1901 by providing instructions to their respective controllers 1913, 1912, 1911. For example, the display 1903 emits linear polarized light 1933 in a first state [X] and in a second state [Y] for the light directed to the focal planes 1931, 1932. Based on the instructions, the controllers 1911-1913 are coordinated in their operation and provide the two or more focal planes 1931, 1932 at the second side 350 of the device 1900 for the user. In some embodiments, the two focal planes 1931, 1932 are based on respective light paths of different lengths as illustrated in other figures. By providing two or more focal planes 1931, 1932, the user (not illustrated) is then free to observe light and objects at the second side 350 of the device 1900 including choosing to focus and accommodate vision based on the light focused at the respective focal planes 1931, 1932.

While many of the embodiments of components described herein are illustrated as having flat surfaces, one or more components of the HMDs illustrated herein may be curved in at least some embodiments. For example, a curvature may be along a first axis and is referred to as a horizontal arc along a certain number of degrees of azimuth with respect to the HMD 100 and the user 110. A curvature along a second axis may be referred to as a vertical arc along a certain number of degrees of altitude with respect to the HMD 100 and the user 110. A third axis is an optical axis relative to the user's eyes 105 and for the optical elements of the HMD 100. Embodiments illustrated in FIGS. 3-17 are shown in relation to the line 2-2 in FIG. 2.

As understood by those in the art, the components are not drawn to scale and are illustrated in an exploded view for sake of clarity. Variations in positions and angles are possible depending on one or more factors including composition of each component. In some embodiments, certain aspects of the techniques described above may implemented by one or more processors of a processing system executing software and provided as instructions to control one or more aspects of the components described herein. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements or components included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
an display for emitting light;
a beam splitter to receive emitted light from the display, the beam splitter including:
a first optical plane parallel plate (PPP);
a polarization beam splitting (PBS) film; and
a mirror coating to generate two orthogonal polarization states with different optical paths thereby creating a first focal plane and a second focal plane at an eye-ward side of the system; and
a first liquid crystal (LC) switch oriented to receive light from the display in a light path between the display and the eye-ward side of the system.

2. The system of claim 1, wherein the beam splitter includes a second optical PPP positioned relative to the first optical PPP to reduce optical aberrations at the eye-ward side of the system.

3. The system of claim 1, wherein the mirror coating of the beam splitter is positioned in a non-parallel orientation relative to the PBS film of the beam splitter to adjust a position of an image, reflected from the mirror coating, at the eye-ward side of the system.

4. The system of claim 1, wherein the first LC switch includes a half wave polarizer, and the system further comprises:
a first linear polarizer proximate to the first LC switch in the light path between the display and the eye-ward side of the system.

5. The system of claim 1, wherein the display is synchronized in operation with the first LC switch to display a first content at the first focal plane and a second content at the second focal plane at the eye-ward side of the system.

6. The system of claim 5, wherein the mirror coating is a partial mirror coating allowing light from a world-side of the beam splitter to pass through the beam splitter to the eye-ward side of the system.

7. The system of claim 1, wherein the first LC switch is positioned in the light path between the display and the beam splitter.

8. The system of claim 7, the system further comprising:
a second LC switch positioned in the light path between the beam splitter and the eye-ward side of the system.

9. The system of claim 1, wherein the first LC switch is positioned in the light path between the beam splitter and the eye-ward side of the system.

10. The system of claim 1, wherein the beam splitter further includes a linear polarizer, and the system further comprises:
a first linear polarizer positioned in the light path at the eye-ward side of the system;
a PBS film positioned in the light path adjacent the first linear polarizer between the display and the eye-ward side of the system;
a first quarter wave plate positioned in the light path adjacent the PBS film;
a partial mirror having a partial mirror surface, the partial mirror positioned in the light path adjacent the first quarter wave plate;
a second quarter wave plate positioned in the light path adjacent the partial mirror; and
a second linear polarizer positioned in the light path adjacent the second quarter wave plate.

11. The system of claim 1, further comprising:
a display backlight configured to pulse the display backlight by an amount between 5% and 25% percentage of a duty cycle after operation of the LC switch has settled.

12. The system of claim 1, further comprising:
a geometric phase (GP) lens positioned in the light path to create an additional focal plane at the eye-ward side of the system, wherein operation of the GP lens is coordinated with operation of the first LC switch and operation of the display.

13. The system of claim 12, wherein the GP lens is a first GP lens and forms a first GP lens and LC switch pair with the first LC switch.

14. The system of claim 13, further comprising:
a second GP lens positioned in the light path between the display and the eye-ward side of the system; and
a second LC switch forming a second GP lens and LC switch pair providing a third focal plane and a fourth focal plane at the eye-ward side of the system.

15. The system of claim 1, wherein the mirror coating of the beam splitter is a partial mirror coating, and the system further comprising:
a geometric phase (GP) lens positioned in the light path to allow ambient light to reach the eye-ward side of the system.

16. A head mounted display (HMD) system comprising:
a display for emitting light thereby creating a light path between a first side of the system and an opposing second side of the system;
a first quarter wave plate positioned in the light path between the display and the second side of the system;
a polarizing beam splitter positioned in the light path between the display and the second side of the system;
a partial mirror positioned in the light path between the display and the second side of the sy stem;
a first geometric phase (GP) lens positioned in the light path between the display and the second side of the system; and
a first liquid crystal (LC) switch in the light path positioned in the light path between the display and the second side of the system; and
a controller operative to coordinate operation of at least two of the first LC switch, the first GP lens, and the display to produce at least two focal planes at the second side of the system.

17. The system of claim 16, wherein the first LC switch includes a half wave polarizer, and the system further comprises:
a first linear polarizer positioned relative to the first LC switch in the light path between the display and the second side of the system to produce the at least two focal planes.

18. The system of claim 16, further comprising:
a beam splitter positioned to receive emitted light from the display, the beam splitter including:
a polarization beam splitting film; and
a mirror coating to generate two orthogonal polarization states with different optical paths.

19. The system of claim 18, wherein the mirror coating of the beam splitter is a partial mirror coating allowing light from a world-side of the beam splitter to pass through the beam splitter to the second side of the system.

20. The system of claim 18, wherein the mirror coating of the beam splitter is positioned in a non-parallel orientation with respect to the polarization beam splitting film of the beam splitter to adjust a position of an image produced by the display, reflected from the mirror coating, at the second side of the system.

21. The system of claim 18, wherein the first LC switch is positioned in the light path between the display and the beam splitter.

22. The system of claim 18, wherein the first LC switch is positioned in the light path between the beam splitter and the second side of the system.

23. The system of claim 16, further comprising:
a second GP lens positioned in the light path between the display and the second side of the system; and
a second LC switch, wherein operation of the second GP lens and the second LC switch produce at least two additional focal planes at the second side of the system.

24. The system of claim 16, further comprising:
a head mountable frame supporting at least the display, the first quarter wave plate, the polarizing beam splitter, the partial mirror, the first GP lens, and the first LC switch.

25. A method to generate focal planes, the method comprising:
generating light by a display;
splitting light generated by the display into at least two light paths of different lengths by operation of at least one of: a beam splitter, a geometric phase (GP) lens, and a liquid crystal (LC) switch; and
selecting a light path by at least one of the GP lens and the LC switch.

26. The method of claim 25, wherein the display and at least one of the beam splitter, the GP lens, and the LC switch are mounted in a frame of a head mounted device.

27. The method of claim 25, wherein splitting the light into at least the two light paths is by the beam splitter and operation of at least one of the GP lens and the LC switch.

\* \* \* \* \*